(12) United States Patent
Kaku et al.

(10) Patent No.: US 7,286,494 B2
(45) Date of Patent: Oct. 23, 2007

(54) POLLING COMMUNICATION SYSTEM AND POLLING CONTROL METHOD

(75) Inventors: Takashi Kaku, Kawasaki (JP); Kyoko Hirao, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 939 days.

(21) Appl. No.: 10/198,607

(22) Filed: Jul. 18, 2002

(65) Prior Publication Data
US 2003/0137986 A1 Jul. 24, 2003

(30) Foreign Application Priority Data
Jan. 18, 2002 (JP) .............................. 2002-009991

(51) Int. Cl.
*H04B 1/44* (2006.01)
*H04J 3/16* (2006.01)
*H04L 12/403* (2006.01)
*H04L 12/43* (2006.01)
*G06F 3/00* (2006.01)

(52) U.S. Cl. ................... 370/282; 370/346; 370/449; 370/461; 340/825.52; 710/46

(58) Field of Classification Search ............... 370/449; 710/46
See application file for complete search history.

(56) References Cited

U.S. PATENT DOCUMENTS

| | | | |
|---|---|---|---|
| 4,667,193 A | | 5/1987 | Cotie et al. |
| 4,829,297 A | * | 5/1989 | Ilg et al. ...................... 370/449 |
| 5,061,922 A | * | 10/1991 | Nishijima et al. ...... 340/825.52 |
| 5,539,743 A | * | 7/1996 | Amemiya et al. ........... 370/461 |
| 5,659,787 A | | 8/1997 | Schieltz |
| 5,673,252 A | * | 9/1997 | Johnson et al. .............. 370/449 |
| 6,252,881 B1 | * | 6/2001 | Samoylenko ................ 370/433 |
| 6,366,566 B1 | * | 4/2002 | Scott ........................... 370/280 |
| 6,522,626 B1 | * | 2/2003 | Greenwood .................. 370/208 |
| 6,640,268 B1 | * | 10/2003 | Kumar .......................... 710/46 |
| 7,006,530 B2 | * | 2/2006 | Spinar et al. ............... 370/468 |

FOREIGN PATENT DOCUMENTS

WO 02/05449 1/2002

OTHER PUBLICATIONS

Onunga, et al. "Performance of CSMA With Priority Acknowledgements on Intrabuilding Power Line Local Area Networks" Digital Communications. May 11, 1988 Proceedings of the Western Canada Programmable Control Systems Conference. New York, IEEE vol. Conf. 2; pp. 30-37, XP000012140.
Onunga, et al. Performance of CSMA with Priority Acknowledgments on Intrabuilding Power Line Local Area Networks, Digital Communications. May 11, 1998, Proceedings of the Western Canada Programmable Control Systems Conference. New York, IEEE, vol. Conf. 2; pp. 30-37, XP0000122140.
European Search Report dated Feb. 18, 2003 for European Application EP 02 01 6246

* cited by examiner

*Primary Examiner*—Chi Pham
*Assistant Examiner*—Melanie Jagannathan
(74) *Attorney, Agent, or Firm*—Katten Muchin Rosenman LLP

(57) ABSTRACT

A polling communication system includes a main station and a plurality of sub stations connected to the main station. The main station includes an address control part and a polling control part. The address control part divides a predetermined polling cycle into a plurality of kinds of polling intervals each having a different number of times of polling, and holds addresses of polling target sub stations corresponding to the respective polling intervals. The polling control part switches the polling intervals and changes the addresses in the address control part according to states of the sub stations. Each of the sub stations includes another polling control part that sends a response when the sub station is polled by the main station.

9 Claims, 19 Drawing Sheets

PRIOR ART

PRIOR ART

PRIOR ART

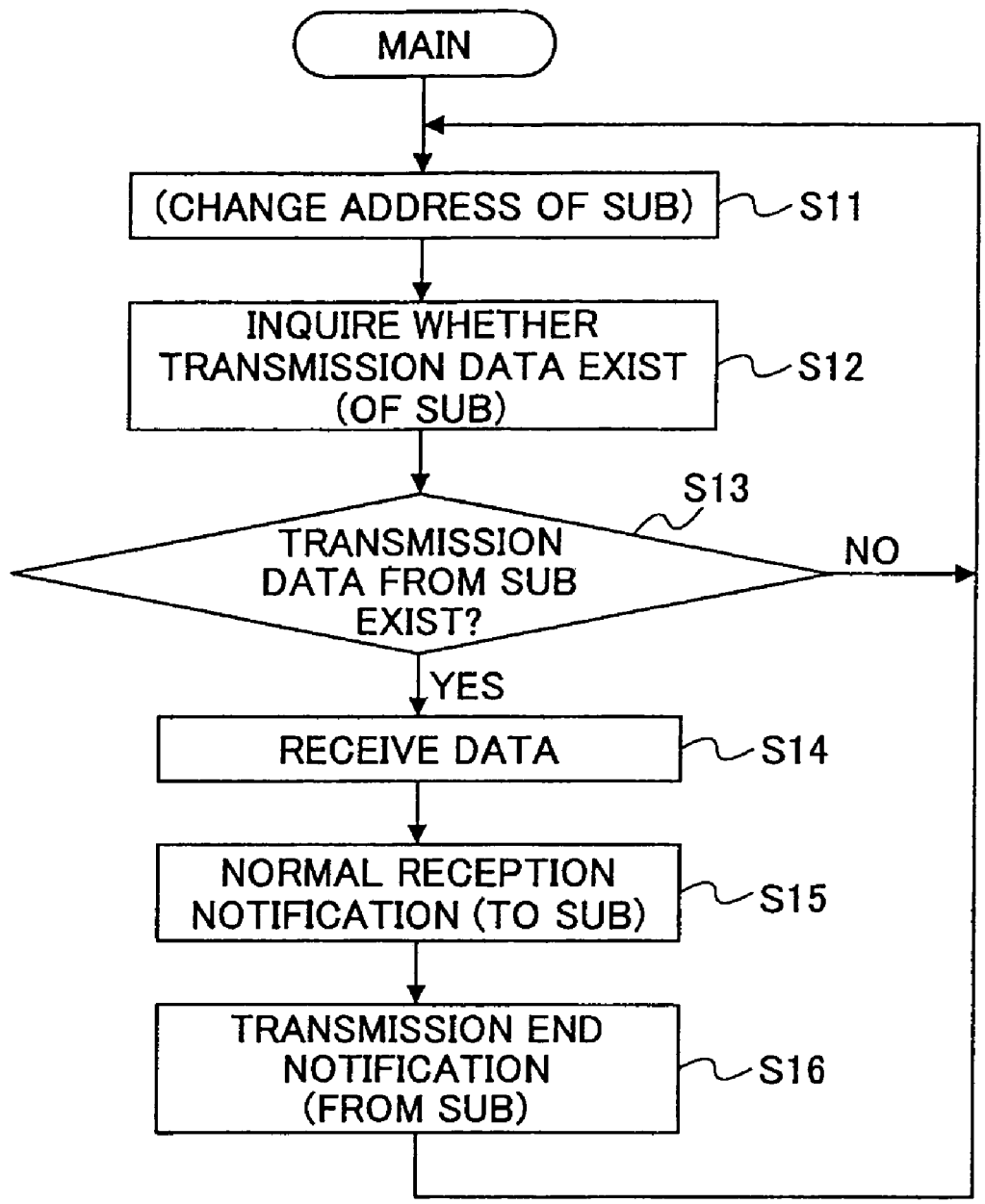

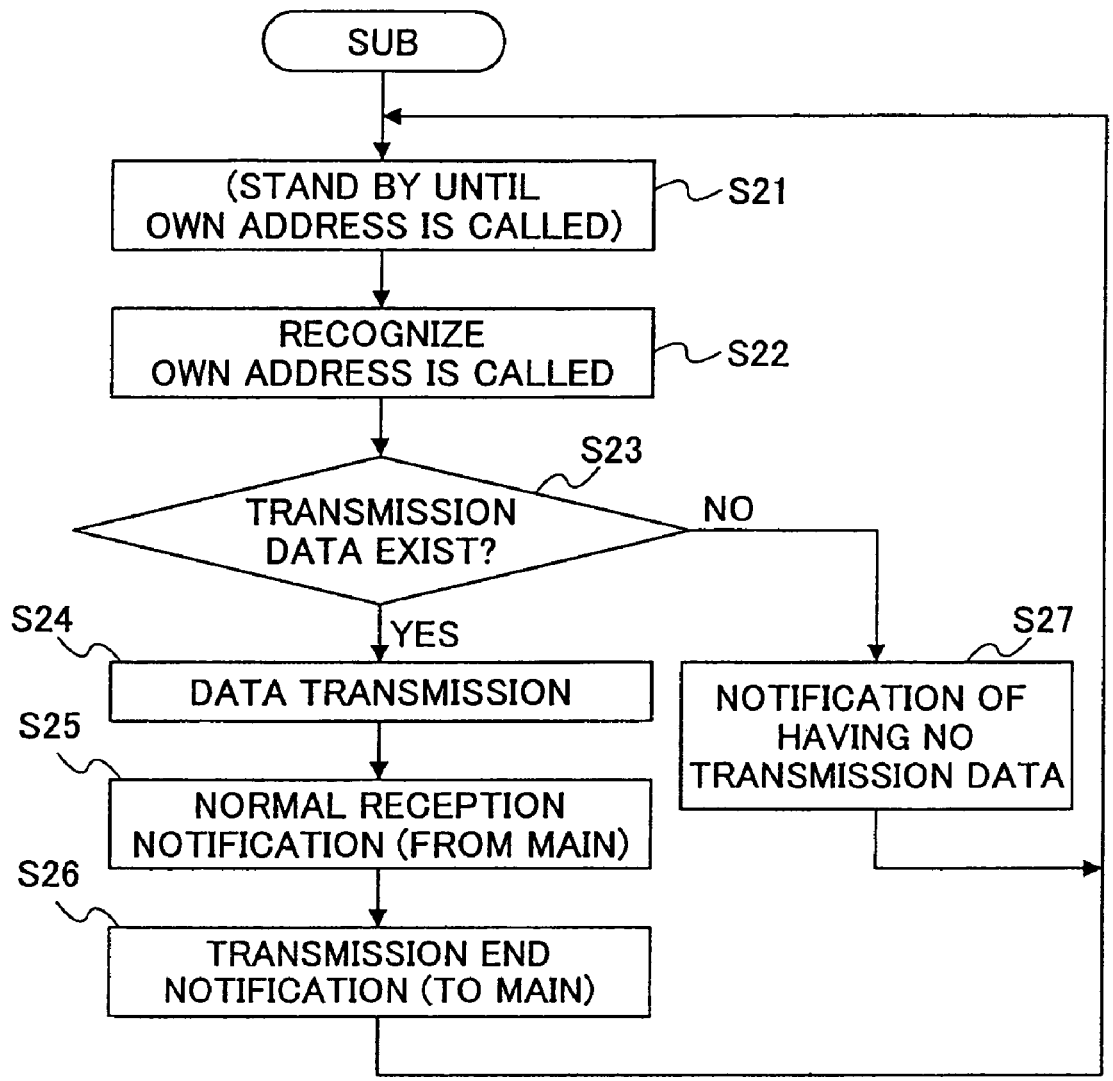

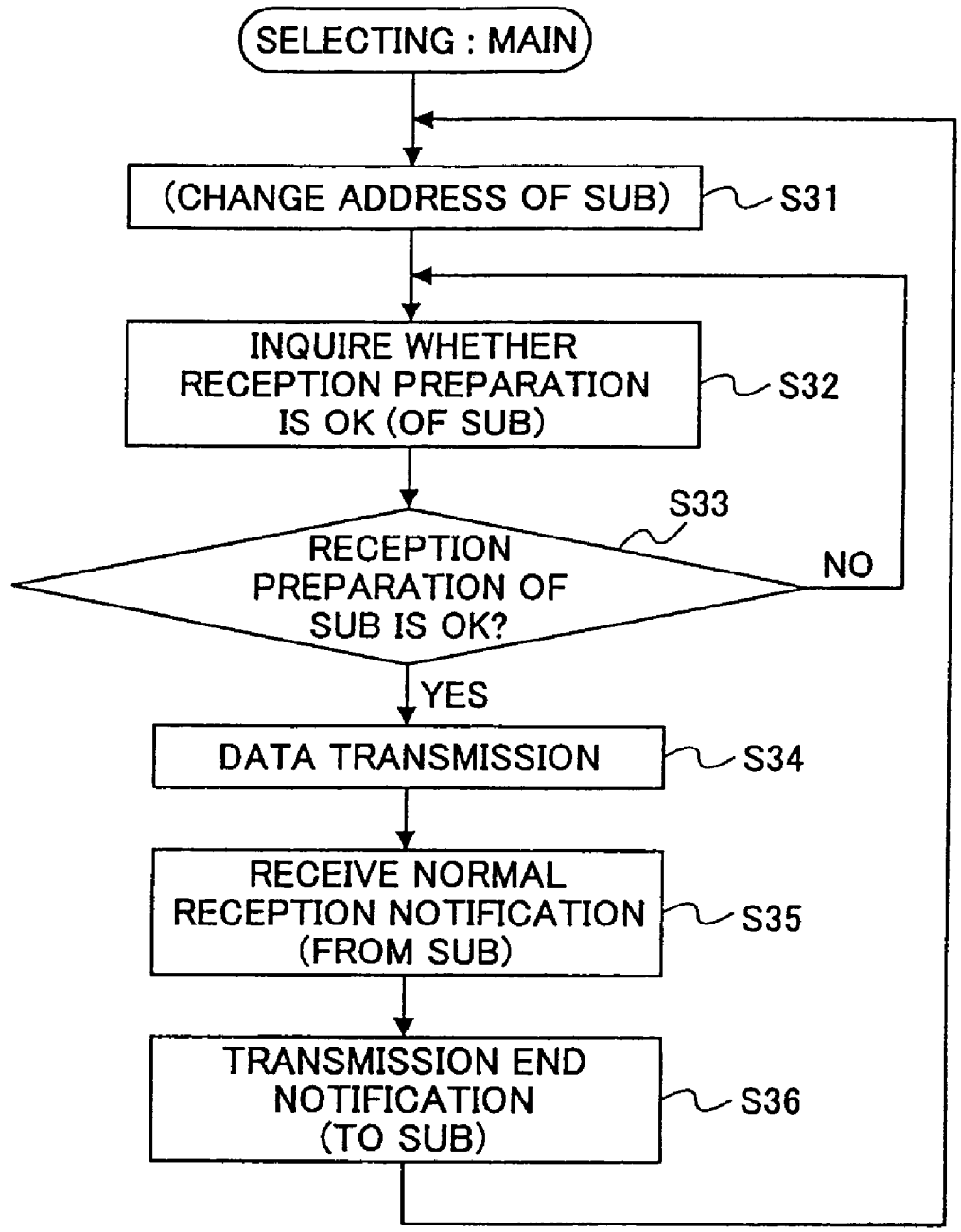

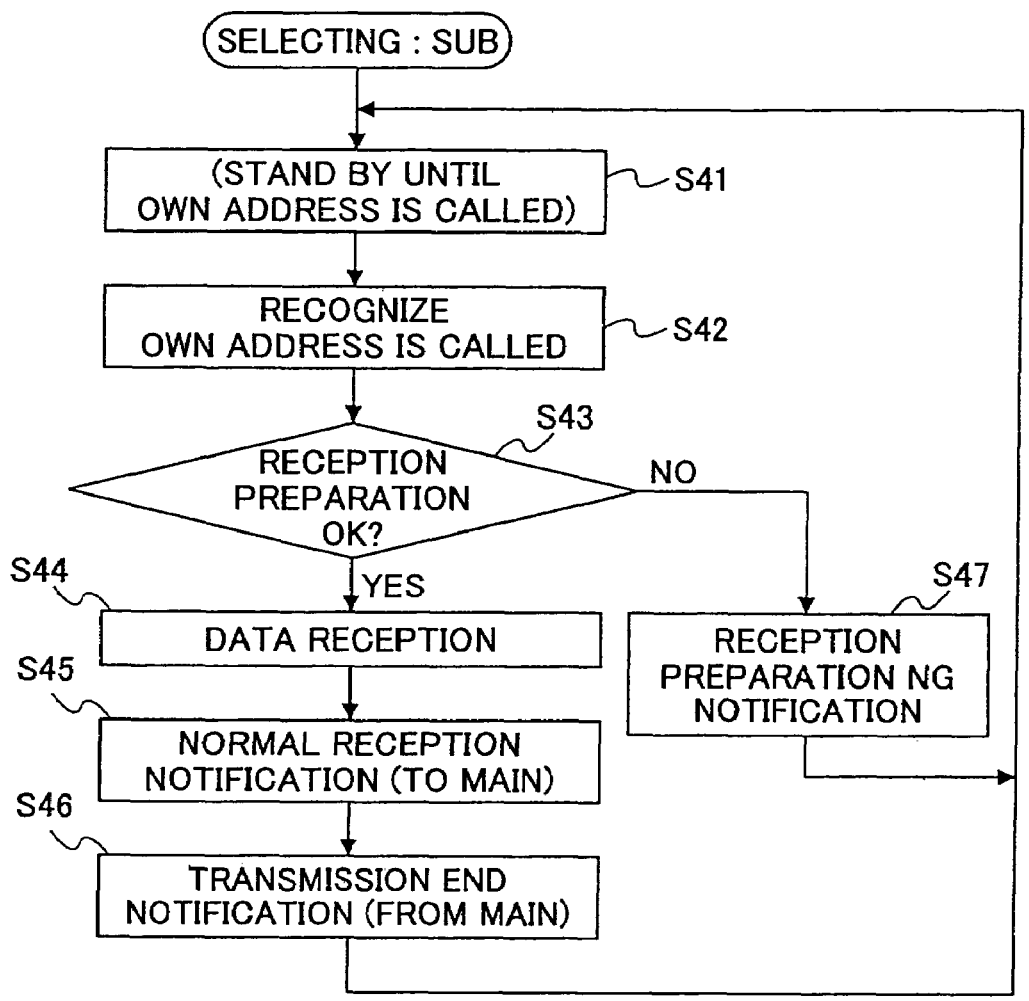

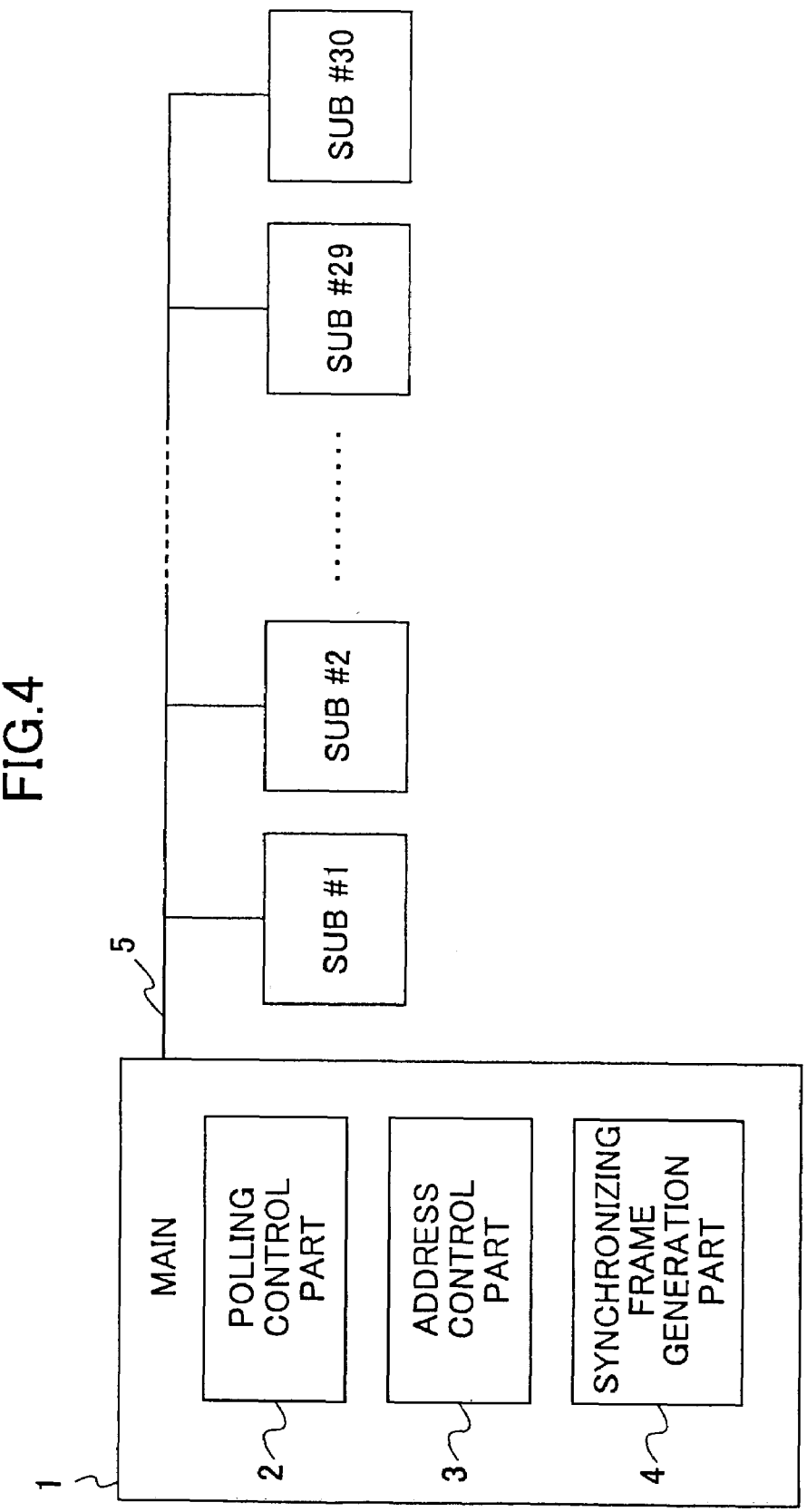

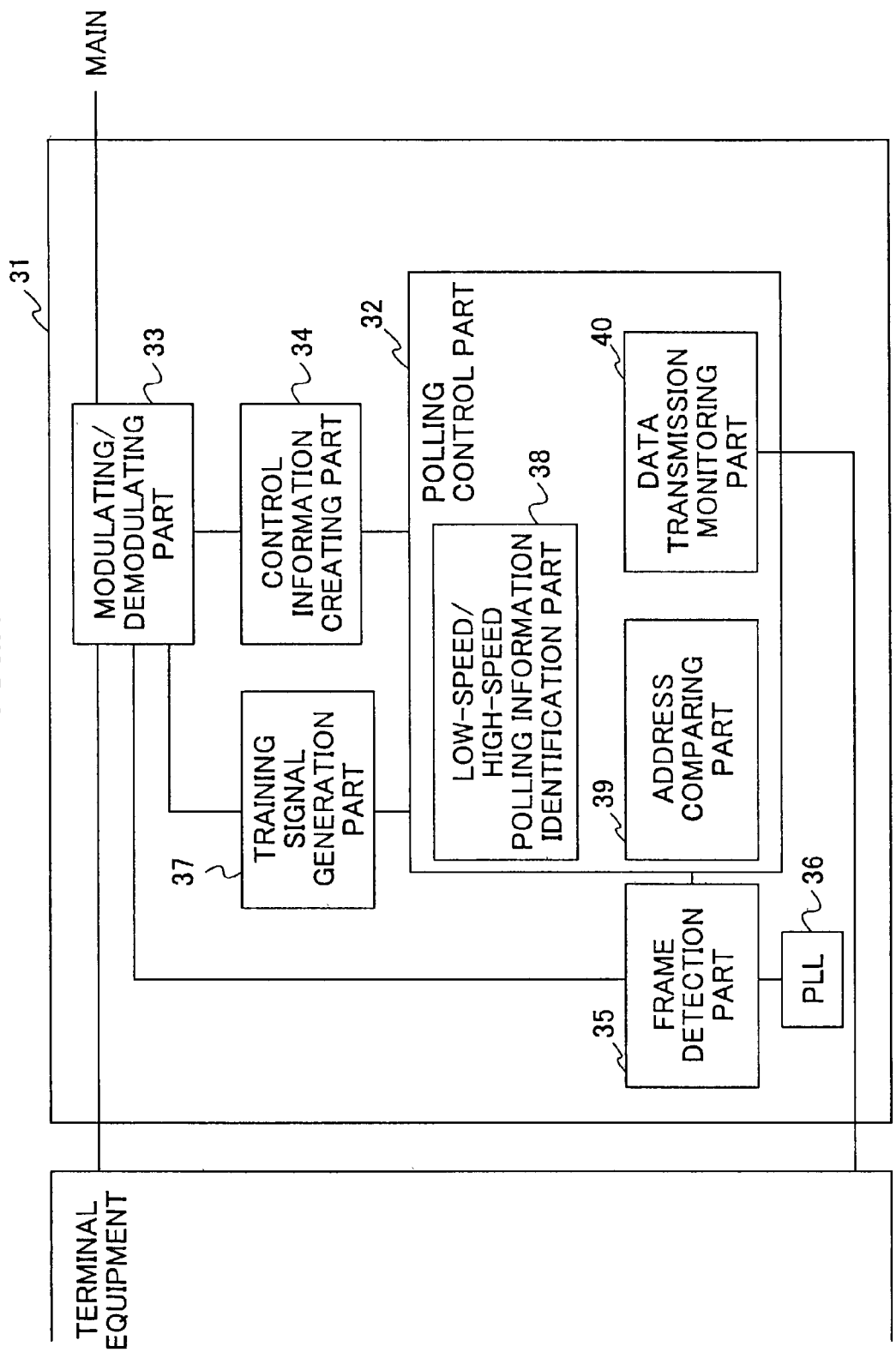

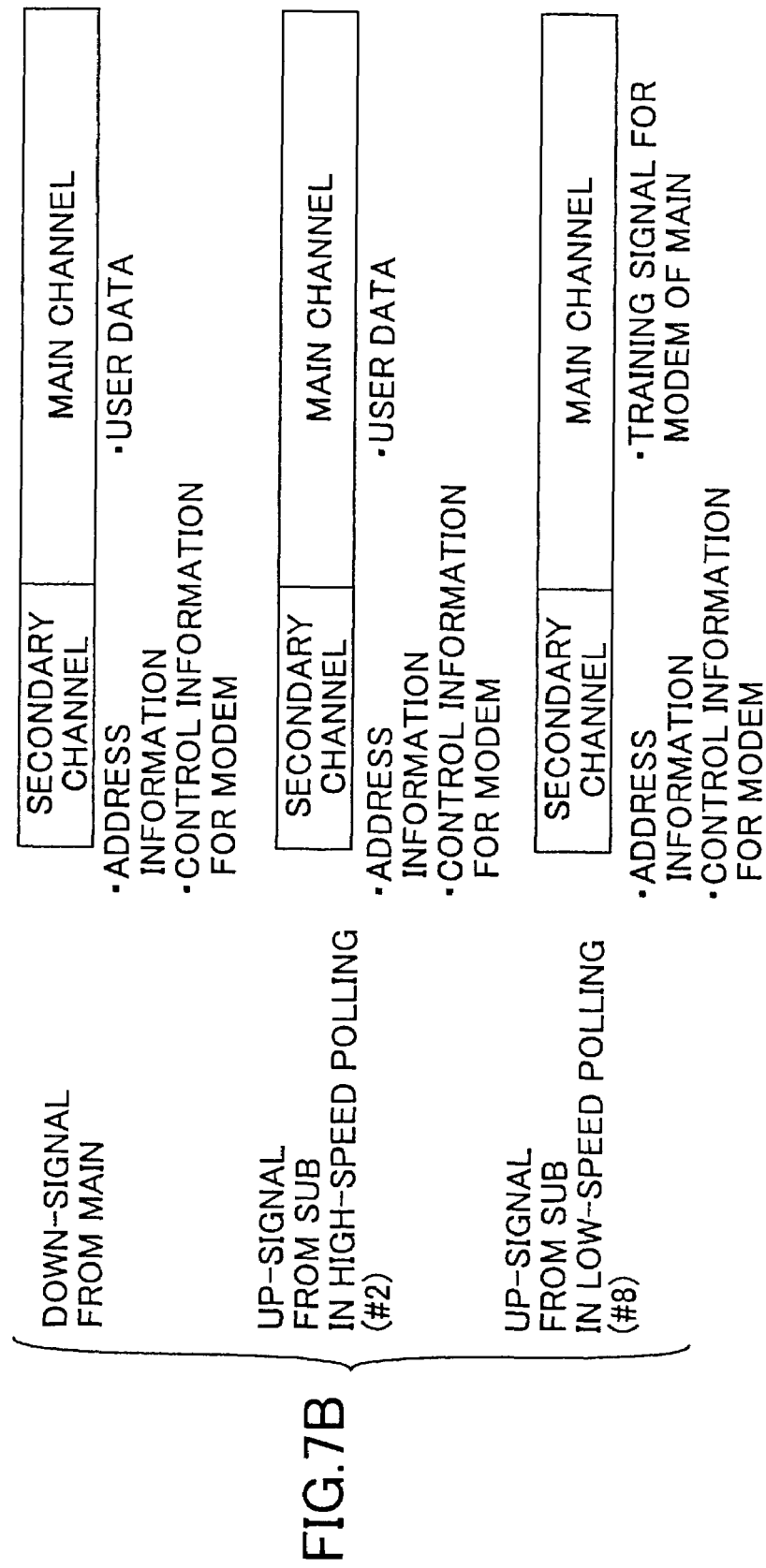

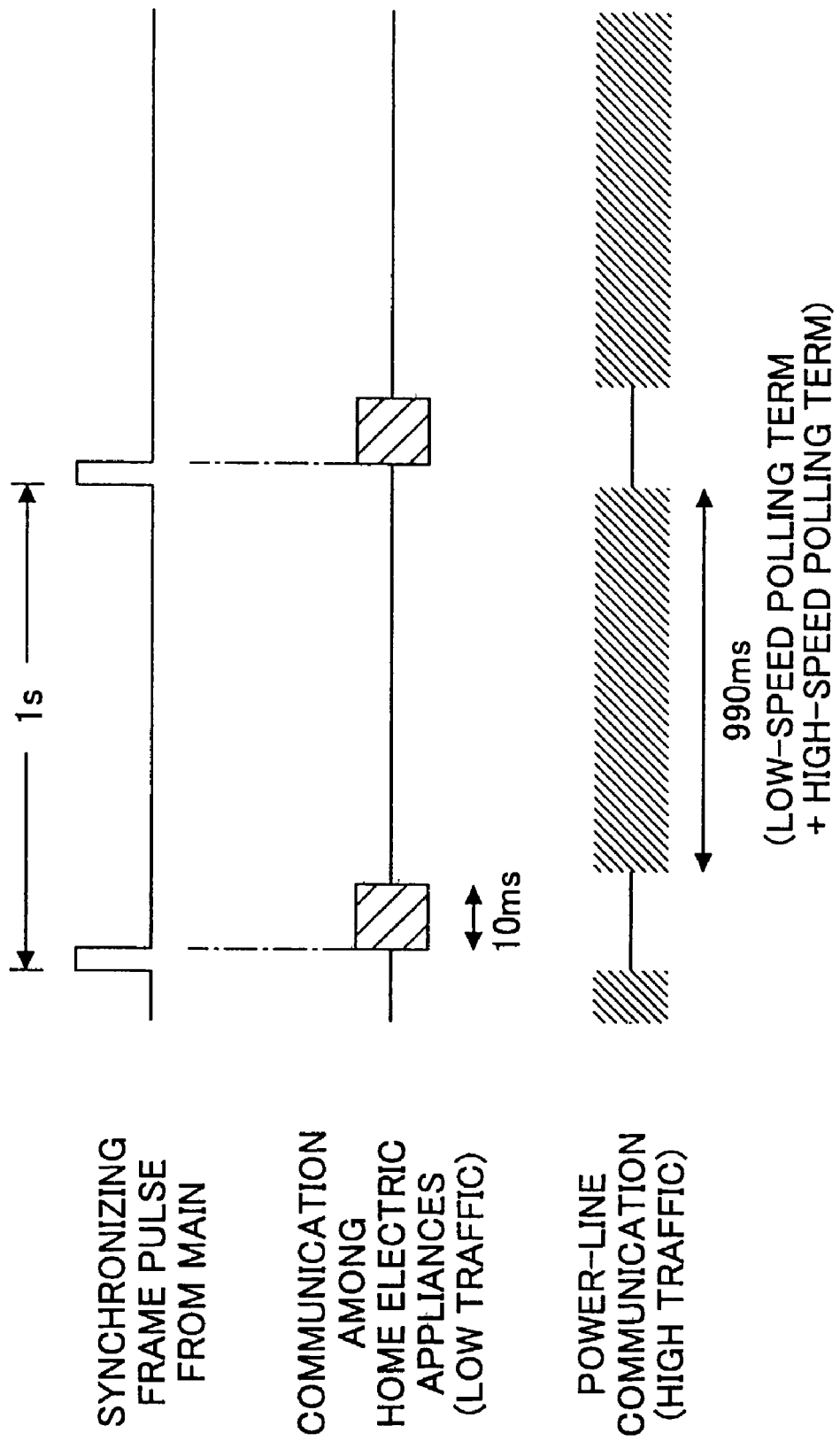

POLLING COMMUNICATION SYSTEM AND POLLING CONTROL METHOD

BACKGROUND OF THE INVENTION

1. Field of the Invention

The present invention relates to a polling communication system and a polling control method which communicate by successively calling a plurality of sub stations from a main station.

2. Description of the Related Art

FIG. 1A illustrates an example of a general structure of a system in which a plurality of sub stations are connected to a main station via a bus. In FIG. 1A, the system includes a host 100, a main station 101, sub stations 102, data terminal equipments (DTEs) 103, and a bus 104. M, M#1, M#2, ... represent modems. #1, #2, ... represent addresses of the sub stations 102. That is, data communication is performed between the data terminal equipments 103 and host 100 by connecting the plurality of sub stations 102 to the main station 101 that is connected to the host 100 through the bus 104.

In such a system using a bus, communication method such as the CSMA/CD (Carrier Sense Multiple Access/Collision Detection) method and a polling/selecting method are employed. The CSMA/CD method is standardized in a LAN (Local Area Network) and the like.

FIG. 1B is a timing diagram for explaining the conventional polling method. As shown in FIG. 1B, for example, a main station inquires sub stations whether or not the sub stations have transmission data by successively specifying an address of each of the sub stations #1, #2, . . . . When a sub station is designated, this designated sub station notifies no-data to the main station when the sub station does not have transmission data, and performs data transmission when the sub station has transmission data. In response to the data transmission from the sub station, the main station provides the sub station with a normal reception notification, and the sub station sends a transmission end notification. Then, the main station inquires a next sub station whether or not the sub station has transmission data by specifying the address of the sub station. Additionally, when a sub station does not respond to the polling, the main station performs the polling according to a next polling address after a predetermined time elapses.

FIG. 1C is a timing diagram for explaining the conventional selecting method. As shown in FIG. 1C, for example, when a main station transmits data by selecting a sub station, the main station inquires the sub station whether or not reception preparation is satisfactory (OK), by adding the address #1 of the sub station, in this case. When the sub station responds to the main station that the preparation is OK, the main station transmits data by adding the address #1 of the sub station. When the sub station normally receives the data, the sub station sends a normal reception notification, and in response to the normal reception notification, the main station sends a transmission end notification.

FIGS. 2A and 2B are flow charts for explaining a conventional polling. FIG. 2A is the flow chart for a main station, and FIG. 2B is the flow chart for a sub station.

First, a description will be given of a process of the main station, with reference to FIG. 2A. In step S11, the main station successively changes an address of a sub station. Then, in step S12, the main station inquires the sub station whether or not the sub station has transmission data, by adding an address of the sub station that is changed this time. In step S13, the main station determines whether or not there is a notification that the sub station has the transmission data. In a case where the sub station has no transmission data (NO in step S13), process returns to step S11. On the other hand, in a case where the sub station responds that the sub station has transmission data (YES in step S13), in step S14, the main station receives data from the sub station. When the main station normally receives the data, in step S15, the main station sends a normal reception notification to the sub station. When the main station receives a transmission end notification from the sub station in step S16, the process returns to step S11.

Next, a description will be given of a process of the sub station, with reference to FIG. 2B. In step S21, each of the sub stations stands by until its address is called. When the sub recognizes that it is called in step S22, in step S23, the sub station determines whether or not there is transmission data. When there is no transmission data (NO in step S23), in step S27, the sub station notifies the main station of having no transmission data. Then, the process returns to step S21. On the other hand, when there is transmission data (YES in step S23), in step S24, the sub station performs data transmission. When the sub station receives a normal reception notification from the main station in step S25, the sub station transmits a transmission end notification to the main station in step S26, and the process returns to step S21.

FIGS. 3A and 3B are flow charts for explaining the conventional selecting method. FIG. 3A is the flow chart for a main station, and FIG. 3B is the flow chart for a sub station.

First, a description will be given of a process of the main station, with reference to FIG. 3A. In step S31, the main station changes an address to the next sub station in sequence. Then, in step S32, the main station inquires the sub station whether or not reception preparation is OK. The main station determines whether or not reception preparation of the sub station is OK in step S33. When the reception preparation is not OK (NO in step S33), the process returns to step S32. On the other, hand, when the reception preparation is OK (YES in step S33), in step S34, the main station transmits data. When the main station receives a normal reception notification from the sub station in step S35, in step 36, the main station transmits a transmission end notification to the sub station.

Next, a description will be given of the process of the sub station, with reference to FIG. 3B. In step S41, the sub station stands by until its address is called. When the sub station recognizes that it is called in step S42, the sub station determines whether or not the reception preparation is OK in step S43. When the reception preparation is not OK (NO in step S43), the sub station sends a reception preparation NG (negative) notification to the main station in step S47, and the process returns to step S41. On the other hand, when the reception preparation is OK (YES in step S43), the sub station receives the data in step S44. Thereafter, in step S45, the sub station sends a normal reception notification to the main station. Then, in step S46, the sub station receives a transmission end notification from the main station, and the process returns to step S41.

The CDMA/CD method generally used in a LAN is standardized by IEEE 802.3, and methods such as 10BASE-T (10 Mbps) and 100BASE-T (100 Mbps) in correspondence with the data transmission rates are known. In such methods, whether or not data communication is currently being performed is determined by carrier detection. A sub station sends data when other sub stations are not performing data communication. In this case, when a plurality of sub stations simultaneously transmit data, transmission collision occurs. When the transmission collision is detected, each of the sub stations randomly sets a waiting time, after which the sub resumes transmission of the data. Accordingly, there is a problem in that, in a high-traffic state, transmission collision occurs frequently and throughput deteriorates.

Further, the polling/selecting method refers to a method in which data communication is performed according to control from the main station. In the selecting method, the main station transmits data by selecting, the sub station. In the polling method, the main station successively specifies the sub stations, and the sub stations transmit data to the main station. In this conventional polling method, even in a case where there are the sub stations that are not online or sub stations in which failure occurs in the plurality of sub stations, all the sub stations are polled in turn. Thus, the sub station that is waiting for data transmission is put in a state of waiting until it is specified. Accordingly, there is a problem in that it is impossible to communicate with a sub station having high traffic proportionally to the traffic.

Additionally, a home electric appliance network is known. The home electric appliance network enables automatic control of various electric home appliances by using interior wiring that provides operating power to the electric appliances in a home or the like as a network for data communication. Generally, the CSMA/CD method is applied to the home electric appliance network. Further, a system is known in which a personal computer, which is connected to an indoor electric power line, is connected to the Internet by a power-line carrier method through an incoming line and low-voltage distribution line. In this case, a modem corresponding to the main station is provided as a transformer that converts high voltage of 6600 V to low voltage of 100 V or 200 V. In addition, a modem corresponding to the sub station is provided indoors. Thus, a system is structured in which data communication is performed by using the low voltage distribution line and incoming line as transmission channels of a power-line carrier system. For that purpose, the indoor electric power line is shared. Thus, there is a problem in that mutual interference occurs.

SUMMARY OF THE INVENTION

It is a general object of the present invention to provide an improved and useful polling communication system and polling control method in which the above-mentioned problems are eliminated.

A more specific object of the present invention is to provide a polling communication system and polling control method capable of coping with a high-traffic environment, and capable of high-speed data communication by applying a polling method without mutual interference even in a case where home electric appliances coexist.

In order to achieve the above-mentioned objects, there is provided according to one aspect of the present invention, a polling communication system, including: a main station; and a plurality of sub stations coupled to the main station, the main station including: an address control part that divides a predetermined polling cycle into a plurality of kinds of polling intervals each having a different number of times of polling and holds addresses of polling target sub stations corresponding to the plurality of kinds of polling intervals; and a first polling control part that switches the plurality of kinds of polling intervals, and at the same time, controls movement from one polling interval to another polling interval of the addresses of the sub stations held in the address control part according to states of the sub stations including whether or not there are responses from the sub stations, each of the sub stations including: a second polling control part that sends a response depending on existence of transmission data when the sub station is polled by the main station.

Additionally, there is provided according to another aspect of the present invention, a polling communication system, including: a main station; a plurality of sub stations; and a home electric appliance network, wherein the main station includes a first polling control part that divides a predetermined cycle into a communication interval of the home electric appliance network and a polling communication interval of the main station and the plurality of the sub stations, and performs polling on the plurality of the sub stations in the polling communication interval, and each of the sub stations includes a second polling control part that sends a response depending on existence of transmission data in response to the polling by the main station.

Additionally, there is provided according to another aspect of the present invention, a polling control method for a polling communication system having a plurality of sub stations coupled to a main station, including the steps of: dividing a predetermined polling cycle of the main station to the plurality of sub stations into a plurality of kinds of polling intervals each having a different number of times of polling; changing the sub stations that have not responded to the polling to polling target sub stations in a polling interval having a few times of polling; and changing the sub stations that have responded to the polling to polling target sub stations in a polling interval having many times of polling.

Additionally, there is provided according to another aspect of the present invention, a polling control method to be implemented in a main station in a polling communication system including the main station, a plurality of sub stations and a home electric appliance network, including the steps of: dividing a predetermined cycle into a communication interval of the home electric appliance network and a polling communication interval of the main station and the plurality of sub stations; and polling the plurality of sub stations in the polling communication interval.

Further, there is provided according to another aspect of the present invention, a main station which couples to a plurality of sub stations, including: an address control part that divides a predetermined polling cycle into a plurality of kinds of polling intervals each having a different number of times of polling and holds addresses of polling target sub stations corresponding to the plurality of kinds of polling intervals; and a polling control part that switches the plurality of kinds of polling intervals, and at the same time, controls movement from one polling interval to another polling interval of the addresses of the sub stations held in the address control part according to states of the sub stations including whether or not a response is received from the sub stations, the response being received depending on existence of transmission data when the sub station is polled.

According to the present invention, in a system in which polling communication is performed between a main station and a plurality of sub stations, a predetermined polling cycle according to frame pulses or the like is divided into a plurality of kinds of polling intervals. Each of the polling intervals has a different number of times of polling, and the a polling interval corresponds to a state of a sub station such as whether or not power of the sub station is turned ON. Therefore, it is possible to reduce the number of times of polling to the sub stations having failure, not being online or the like, and increase the number of times of polling to the sub stations that have high probability of having transmission data. Thus, improving throughput is realized. In addition, it is possible to efficiently operate the system by appropriately changing the length of each of the polling intervals depending on the number of the sub stations in each of the polling intervals.

Further, in a polling communication system combined with a home electric appliance network, by dividing a predetermined cycle into a communication interval of home electric appliances and a polling communication interval, it is possible to prevent mutual interference and realize coexistence when using a communication pathway via the same electric power line and the like. At the same time, there is another advantage in that communication between a main station of high traffic and a plurality of sub stations can be performed smoothly. Additionally, there is another advantage of improving the throughput by increasing the number of times of polling to sub stations that have high probability of having transmission data, by dividing the polling communication interval into a high-speed polling interval and a low-speed polling interval, for example, and by varying the number of times of polling depending on states of sub stations.

Other objects, features and advantages of the present invention will become more apparent from the following detailed description when read in conjunction with the following drawings.

BRIEF DESCRIPTION OF THE DRAWINGS

FIG. 2A is a flow chart for explaining a process of a main station in conventional polling;

FIG. 2B is a flow chart for explaining a process of a sub station in conventional polling;

FIG. 3A is a flow chart for explaining a process of a main station in conventional selecting;

FIG. 3B is a flow chart for explaining a process of a sub station in conventional selecting;

FIG. 4 is a block diagram of an embodiment of the present invention;

FIG. 6 is a block diagram showing a sub station of the embodiment of the present invention;

FIG. 7B is a data diagram showing structures of signals sent from/to the main station to/from the sub station;

FIG. 8 is a flow chart for explaining a process according to the embodiment of the present invention when power of the main station is turned ON;

FIG. 14 is a timing diagram for explaining communication timing according to the embodiment according to the present invention.

DETAILED DESCRIPTION OF THE PREFERRED EMBODIMENTS

Figure 1A:
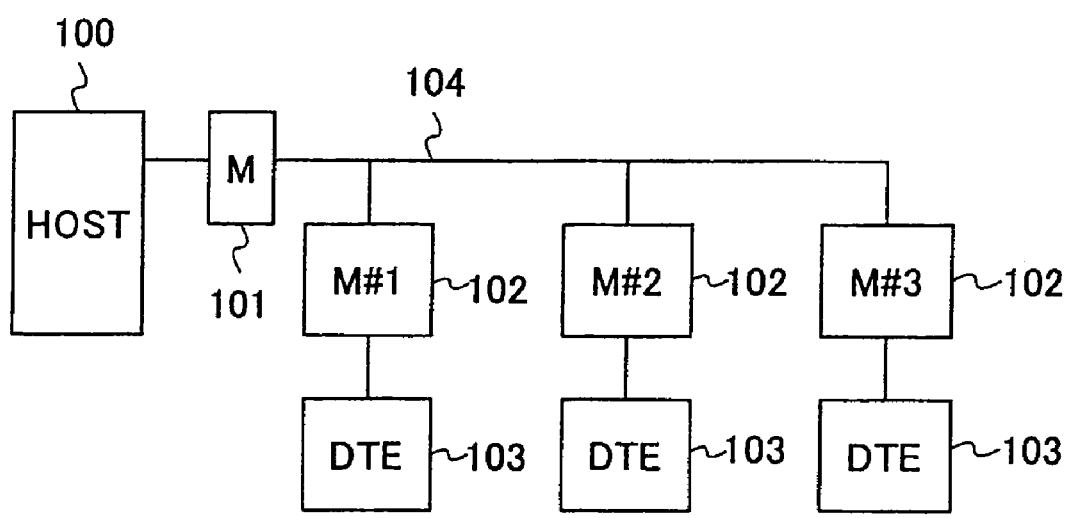
FIG. 1A is a block diagram showing a conventional system in which a plurality of sub stations are connected to a bus that is connected to a main station.
Figure 1B:
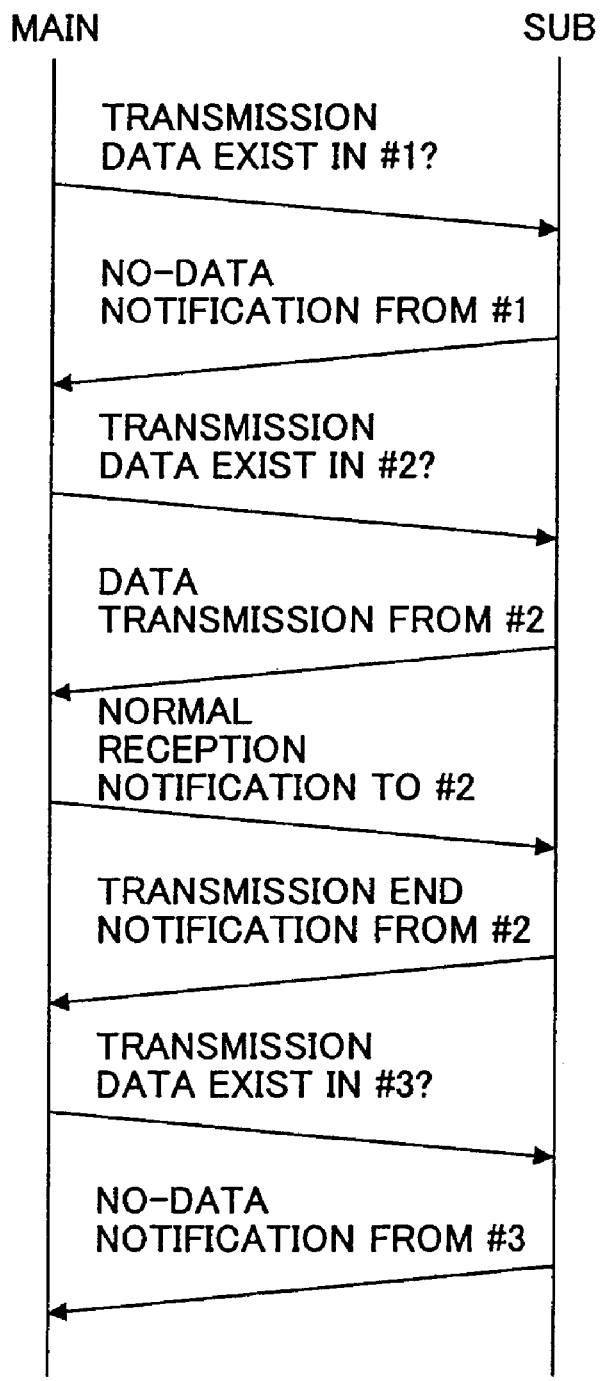
FIGS. 1B and 1C are timing diagrams for explaining a conventional polling method and a conventional selecting method, respectively.
Figure 1C:
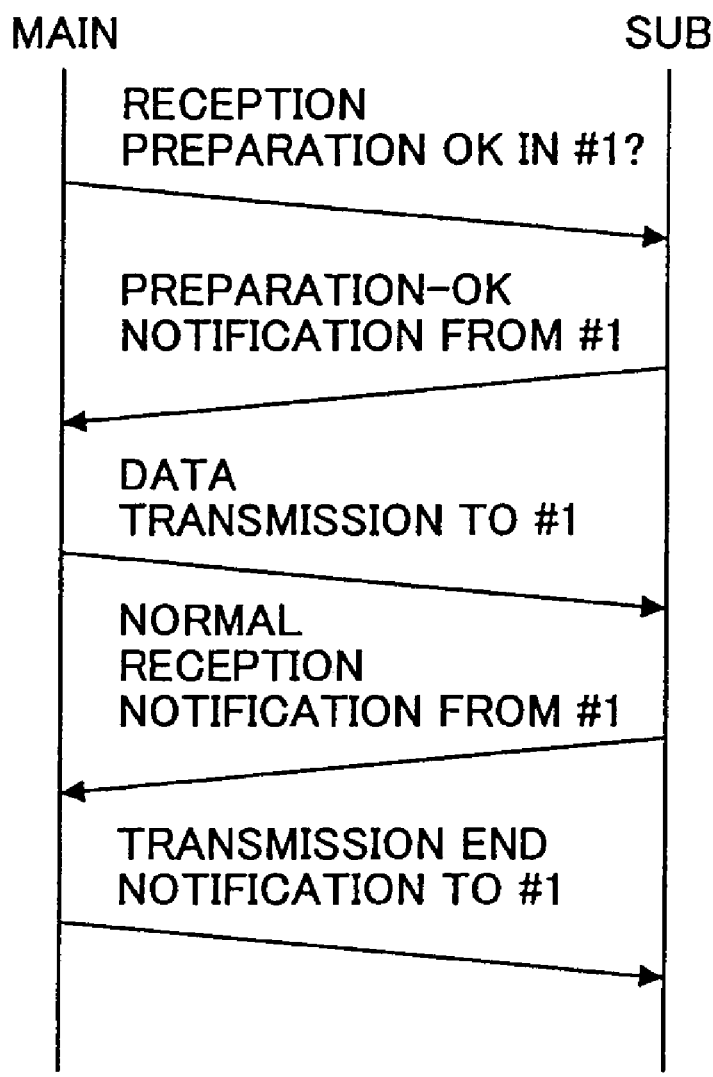

FIG. 4 is a block diagram for explaining an embodiment of the present invention. FIG. 4 illustrates a polling communication system in which a plurality of sub stations #1 through #30 are connected to a main station 1 through a bus 5. The main station 1 includes a polling control part 2, an address control part 3, and a synchronizing frame generation part 4. FIG. 4 shows a case where 30 sub stations are connected, however, the number of the sub stations can be selected arbitrarily. Further, the bus 5 can be a normal transmission channel that transmits data, or a distribution line and inside electric line or the like in the power-line carrier system.

The main station 1 does not perform polling uniformly to all the sub stations #1 through #30. The main station 1 performs the polling depending on states of the sub stations by dividing a predetermined polling cycle into a plurality of polling intervals, such as a polling interval in which a large number of pollings is made, a polling interval in which a small number of pollings is made and the like. For example, the polling cycle can be divided into two, that is, a high-speed polling interval in which a large number of pollings is made, and a low-speed polling interval in which a small number of pollings is made. Or, the polling cycle can be divided into three by further including a medium-speed polling interval in which an intermediate number of pollings is made. Further, the polling cycle can be divided into more numbers of polling intervals, each of the intervals having a different number of polling times.

For example, in a case where a predetermined polling cycle is divided into two, the high-speed polling interval and low-speed polling interval, low-speed polling target sub stations that responded to polling in the low-speed polling interval are changed to high-speed polling target sub stations, and the low-speed polling target sub stations that did not respond remain low-speed polling target sub stations. In this case, the polling control part 2 has a function to switch between the high-speed polling interval and the low-speed polling interval. The address control part 3 manages addresses of the high-speed polling target sub stations and addresses of the low-speed polling target sub stations. Additionally, the synchronizing frame generation part 4 sends frame pulses representing the predetermined polling cycle including high-speed polling and low-speed polling intervals. It should be noted that, in a case where a plurality of kinds of polling intervals are set, the address control part 3 holds addresses of polling target sub stations depending on the number of polling times in correspondence with the respective polling intervals.

Accordingly, the sub stations that responded to the low-speed polling are changed to high-speed polling target sub stations. The sub stations that responded to the high-speed polling continue to remain high-speed polling target sub stations. Further, the sub stations that did not respond to the high-speed polling are changed to low-speed polling target sub stations. In this case, it is also possible to change the sub stations to low-speed polling target sub stations when the number of consecutive times of not responding exceeds a predetermined number of times.

Additionally, in a case where the polling cycle is divided into the above-mentioned three polling intervals, the sub stations are divided into the low-speed polling target sub stations, medium-speed polling target sub stations and high-speed polling target sub stations. In this case, the address control part 3 manages the address of each of the sub stations. In addition, the high-speed polling target sub stations can be changed to medium-speed polling target sub stations when not responding. Further, the medium-speed polling target sub stations can be changed to low-speed polling target sub stations when not responding. Further, the low-speed polling target sub stations can be changed to medium-speed polling target sub stations when responding. In addition, the medium-speed polling target sub stations can be changed to high-speed polling target sub stations when responding. In this case, it is also possible to change the sub stations from targets of a current polling interval to targets of another polling interval when the consecutive number of times of not responding exceeds a predetermined number of times. Thus, it is possible to improve response times of the sub stations having transmission data, since the number of times of polling to the sub stations that require polling becomes large, and the low-speed polling is performed on the sub stations that are not online or the like.

Figure 5:
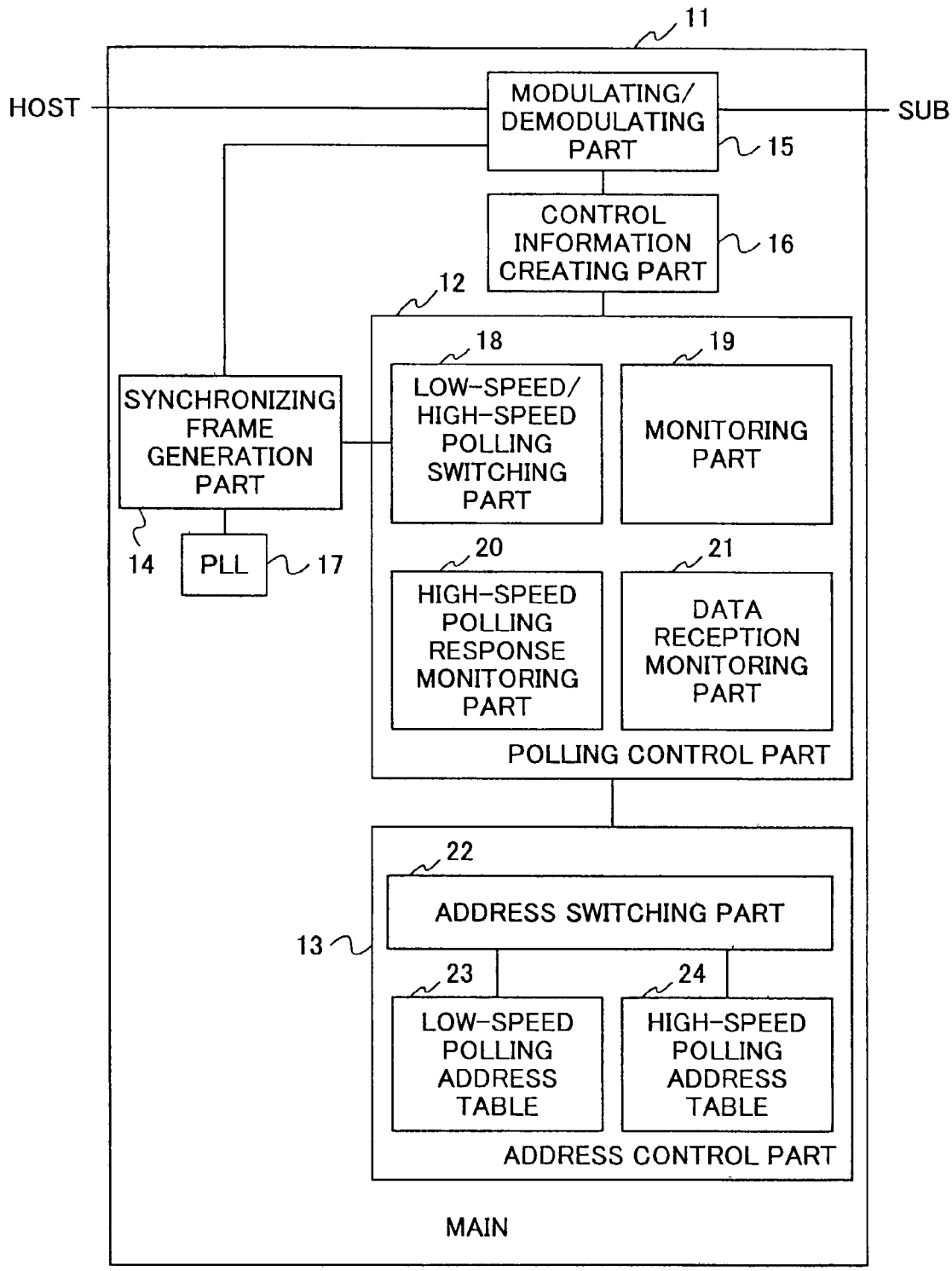
FIG. 5 is a block diagram showing a main station of the embodiment of the present invention.

FIG. 5 is a block diagram of the main station of the embodiment of the present invention. In FIG. 5, a main station 11 includes, a polling control part 12, an address control part 13, a synchronizing frame generation part 14, a modulating/demodulating part (modem) 15, a control information creating part 16, and a phase synchronized oscillator (PLL) 17. The polling control part 12 includes a low-speed/high-speed polling switching part 18, a monitoring part 19 for monitoring the number of times of low-speed/high-speed polling, a high-speed polling response monitoring part 20, and a data reception monitoring part 21. Additionally, the address control part 13 includes an address switching part 22, a low-speed polling address table 23, and a high-speed polling address table 24. In other words, a case is shown where the predetermined polling cycle is divided into two polling intervals: a low-speed polling interval and a high-speed polling interval.

In addition, the synchronizing frame generation part 14 generates frame pulses of the predetermined polling cycle according to a clock signal from the phase synchronized oscillator 17, and inputs the frame pulses to the modulating/demodulating part 15. Then, the modulating/demodulating part 15 sends the frame pulses to the sub station. The low-speed/high-speed polling switching part 18 of the polling control part 12 switches from/to the low-speed polling interval to/from the high-speed polling interval in the predetermined polling cycle, according to a timing signal including the frame pulses from the control information creating part 16. It should be noted that in a case where the predetermined polling cycle is divided into more than two kinds of polling intervals, the low-speed/high-speed polling switching part 18 has a structure to switch to each of the polling intervals.

Additionally, the high-speed polling response monitoring part 20 monitors whether or not the sub station responded to high-speed polling. When the sub station responded, no change is made. When the sub station did not respond, the high-speed polling response monitoring part 20 notifies the address control part 13 and performs control to change the nonresponding sub station to a low-speed polling target sub station. The address control part 13 moves the address of the nonresponding sub station from the high-speed polling address table 24 to the low-speed polling address table 23. Additionally, the data reception monitoring part 21 monitors reception of data from the sub station. The monitoring part 19 monitors the number of times of low-speed polling and the number of times of high-speed polling.

Further, addresses of the low-speed polling target sub stations are stored in the low-speed polling address table 23 of the address control part 13. On the other hand, addresses of the high-speed polling target sub stations are stored in the high-speed polling address table 24 of the address control part 13. The address switching part 22 reads and sends the addresses of the low-speed polling target sub stations from the low-speed polling address table 23 in the low-speed polling interval. Additionally, the address switching part 22 reads and sends the addresses of the high-speed polling target sub stations from the high-speed polling address table 24 in the high-speed polling interval. Further, instead of using the low-speed polling address table 23 and high-speed polling address table 24, an address table may be used in which whether an address of a sub station is a low-speed polling target or a high-speed polling target is represented by a pointer or a flag. In addition, the modulating/demodulating part 15 has functions of modulation for sending to the sub station, and demodulation for receiving from the sub station. For example, the modulating/demodulating part 15 demodulates data from the sub station and forwards the data thereof to the host.

FIG. 6 is a block diagram of the sub station of the embodiment of the present invention. In FIG. 6, a sub station 31 includes, a polling control part 32, a modulating/demodulating part 33, a control information creating part 34, a frame detection part 35, a phase synchronized oscillator (PLL) 36, and a training signal generation part 37. The polling control part 32 includes a low-speed/high-speed polling information identification part 38, an address comparing part 39, and a data transmission monitoring part 40.

The modulating/demodulating part 33 receives and demodulates data and control information from the main station. Additionally, the modulating/demodulating part 33 modulates and transmits data and control information to be sent to the main station. The frame detection part 35 detects frame pulses from the main station based on a clock signal from the phase synchronized oscillator 36, and provides a timing signal to the polling control part 32. The address comparing part 39 of the polling control part 32 compares a polling address sent from the main station with own address of the sub station. When the addresses match, it denotes that the sub station is specified. Thus, the address comparing part 39 notifies the low-speed/high-speed polling information identification part 38 and the data transmission monitoring part 40.

The data transmission monitoring part 40 determines whether or not there is a request for data transmission from terminal equipment that monitors/controls using an RS signal or CS signal, for example. When there is a request for data transmission, the data transmission monitoring part 40 controls transmission of the data. When there is no request for data transmission, the data transmission monitoring part 40 notifies the control information creating part 34 and sends only a response to the main station. Additionally, the training signal generation part 37 generates and sends a training signal to the modem of the main station, when responding to polling by the main station in the low-speed polling interval. Further, the control information creating part 34 creates and sends control information such as a response in a case of no data transmission and the like.

Figure 7A:
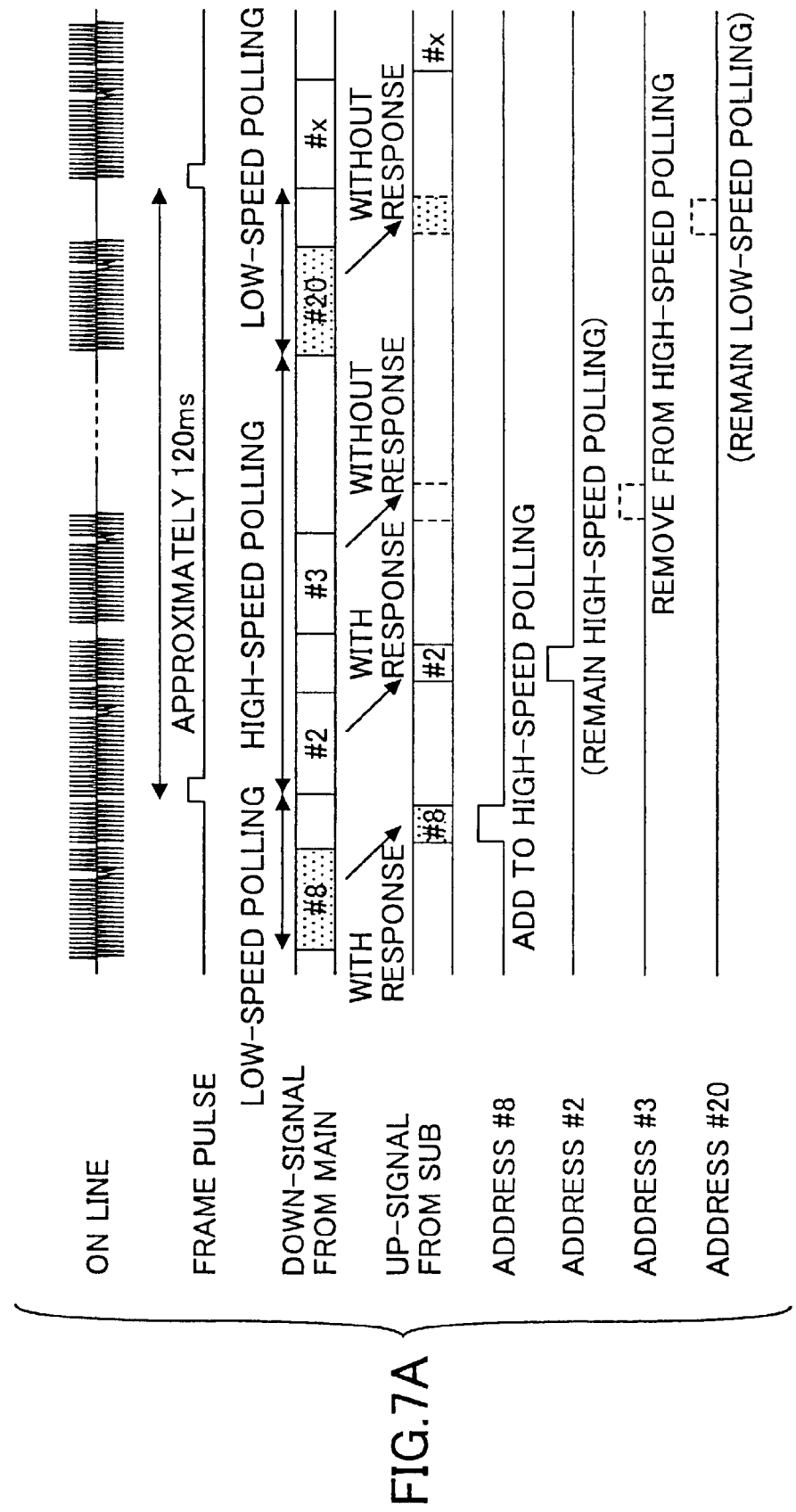
FIG. 7A is a timing diagram for explaining a process according to the embodiment of the present invention.

FIG. 7A is a timing diagram of signals of the embodiment of the present invention. FIG. 7A illustrates a modulation signal on a line, frame pulses, a down-signal from the main station to the sub station, an up-signal from the sub station to the main station, and addresses of the sub stations #8, #2, #3, and #20. FIG. 7B is a data diagram showing structures of the signals. In FIG. 7B, a down-signal from the main station, an up-signal from the sub station in high-speed polling, and an up-signal from the sub station in low-speed polling are illustrated. Each of these signals includes a secondary channel and a main station channel. The secondary channel includes control information for a modem, address information, a flag representing the high-speed/low-speed polling (For example, it is possible to set a high-speed polling flag ON in high-speed polling, and set the high-speed polling flag OFF in low-speed polling.), speed information and the like. The secondary channels of the up-signals from the sub station further include line quality information. Additionally, the main station channel of the down-signal from the main station and the main station channel of the up-signal from the sub station in the high-speed polling include user data. The main station channel of the up-signal from the sub station in the low-speed polling includes a training signal for the modem of the main station. This training signal can be generated by the training signal generation part 37 (refer to FIG. 6) of the sub station 31.

FIG. 7A shows a case where the frame pulses have a cycle of 120 ms, for example. The cycle is divided into the high-speed polling interval in which a large number of pollings is made, and the low-speed polling interval in which a small number of pollings is made. In the low-speed polling interval, when the main station sets and sends the address #8 of the sub station, for example, which is a low-speed polling target, in the secondary channel, and the sub station having the address #8 responds using the secondary channel including the address information and the main station channel including training information, as shown by the up-signal from the sub station in the low-speed polling of FIG. 7B, the main station changes the sub station from a low-speed polling target to a high-speed polling target.

Additionally, in the high-speed polling interval, when the main station sets and sends the address #2 of the sub station, for example, which is a high-speed polling target, in the secondary channel, and the sub station having the address #2 responds, the sub station remains a high-speed polling target sub station. When the main station sets and sends the address #3 of the sub station, for example, which is a high-speed polling target, in the secondary channel, and the sub station does not respond, the sub station is changed from a high-speed polling target sub station to a low-speed polling target sub station. Further, when the main station sets and sends the address #2 of the sub station which is a low-speed polling target, and the sub station has not responded, the sub station remains a low-speed polling target. Accordingly, the sub station that is not online and the sub station in which failure occurs or the like remain low-speed polling targets. On the other hand, when the sub station responds to the polling, the sub station is changed to a high-speed polling target. Therefore, it is possible to improve response time by performing the high-speed polling to the sub station having transmission data or the sub station with high probability of having transmission data.

Figure 8:
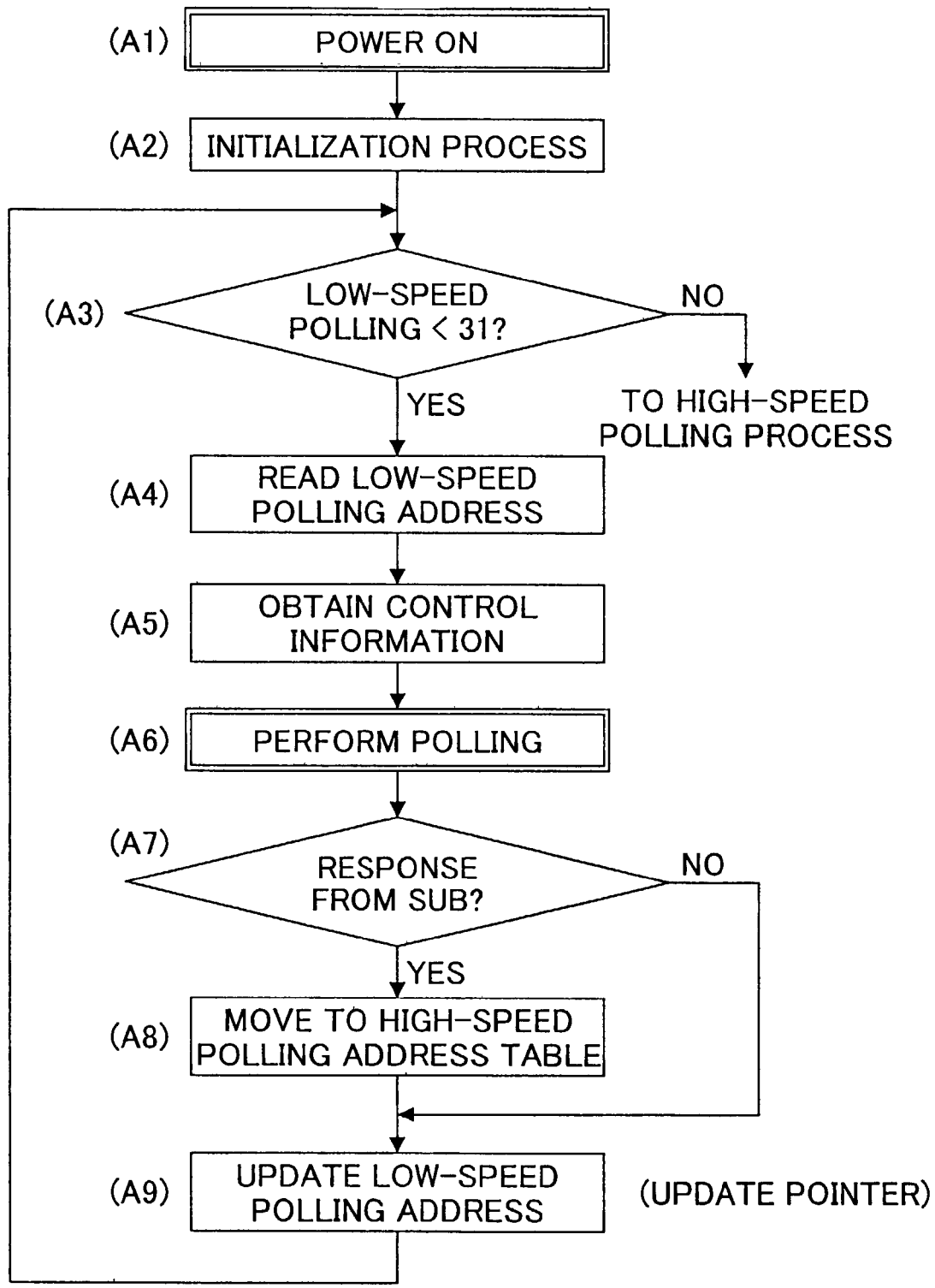

FIG. 8 is a flow chart for explaining a process of the embodiment of the present invention. In FIG. 8, the process in the polling communication system where 30 sub stations are connected to the main station is shown. First, in step A1, power of the main station is turned ON. In step A2, an initialization process is performed. It is assumed that addresses of the sub stations are #1 through #30, all of the sub stations are regarded as low-speed polling target sub stations, and low-speed polling addresses of the sub stations are set to #1 through #30. Then, in step A3, polling is performed on the sub stations in turn, and whether or not all the sub stations are polled is determined by whether or not the low-speed polling address exceeds 30. When the low-speed polling address exceeds 30 (NO in step A3), the process proceeds to a high-speed polling process.

Additionally, when the low-speed polling address does not exceed 30 (YES in step A3), in step A4, the low-speed polling address is read from the low-speed polling address table 23 (refer to FIG. 5). Step A5 takes the address or control information into a secondary channel. In step A6, the polling is performed according to the control by the polling control part 12. Thereafter, step A7 monitors whether or not there is a response from the sub station. If there is no response from the sub station (NO in step A7), the process proceeds to step A9. On the other hand, if there is a response from the sub station (YES in step A7), the address of the sub station is moved from the low-speed polling address table 23 to the high-speed polling address table 24 in step A8, and the process proceeds to step A9.

In step A9, the low-speed polling address is updated, and the process proceeds to step A3. In this case, a pointer can represent the address on which the polling is performed. Thus, it is possible to update the low-speed polling address by updating the pointer. According to such a process, it is possible to automatically set the low-speed polling target sub stations and the high-speed polling target sub stations when starting an operation of the polling communication system.

Figure 9:
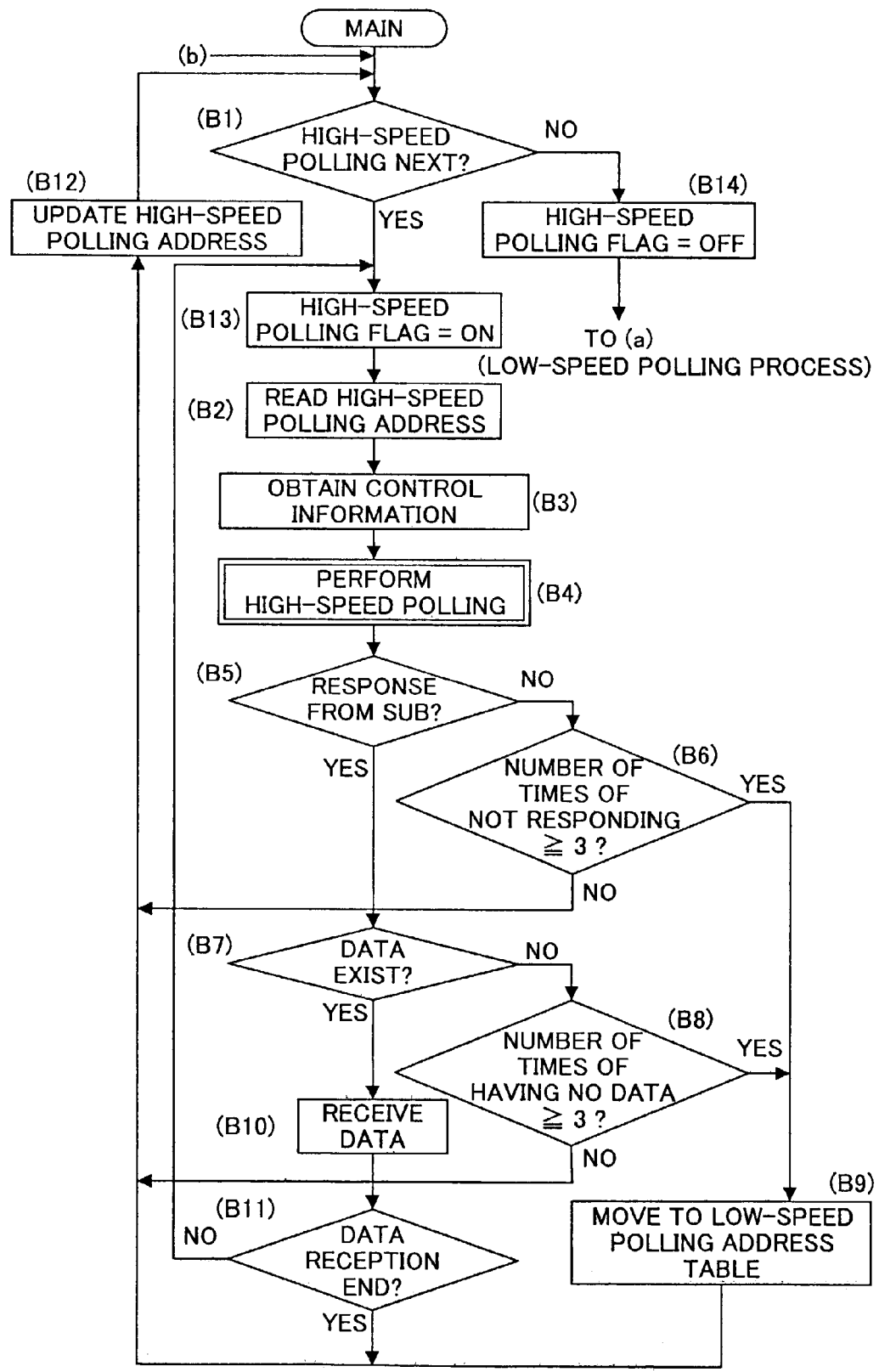
FIG. 9 is a flow chart for explaining a process of the main station according to the embodiment of the present invention.
Figure 10:
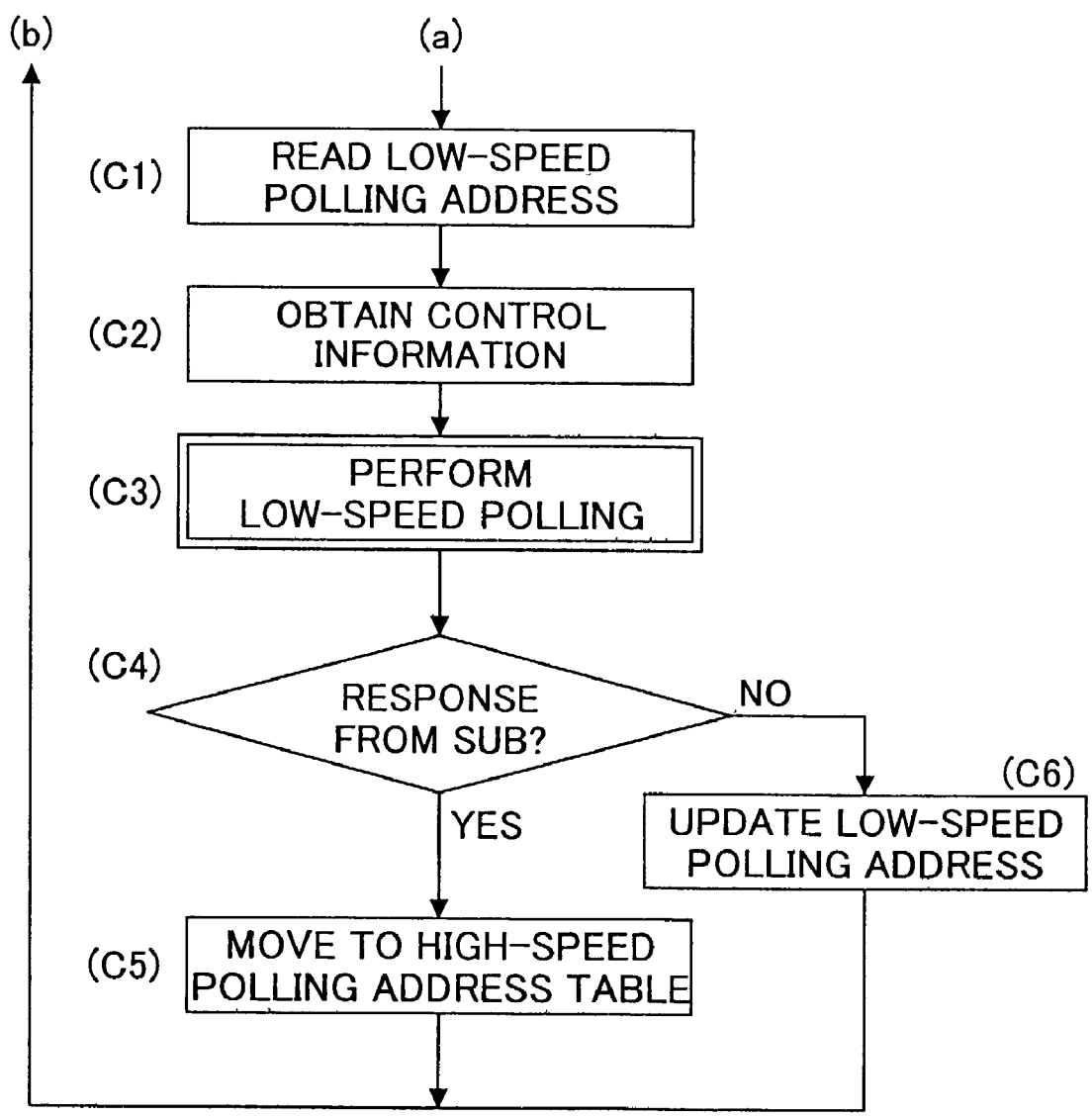
FIG. 10 is a continuation of the flow chart of FIG. 9 for explaining the process of the main station.

FIGS. 9 and 10 are flow charts for explaining a process of the main station of the embodiment of the present invention. Step B1 decides whether or not the next polling is a high-speed polling. If the decision result in step B1 is NO, the process proceeds to step B14. On the other hand, if the decision result in step B1 is YES, a high-speed polling flag is set ON in step B13. Thereafter, step B2 reads a high-speed polling address from the high-speed polling address table 24 (refer to FIG. 5). Additionally, step B3 obtains control information. Step B4 forms a signal including an address of the above-mentioned high-speed polling target sub station and a secondary channel having the high-speed polling flag that is set ON, and performs high-speed polling according to the polling control part 12. In step B5, the high-speed polling response monitoring part 20 monitors whether or not there is a response from the sub station. If there is no response from the sub station (NO in step B5), the process proceeds to step B6. If there is a response from the sub station (YES in step B5), the process proceeds to step B7.

Step B6 decides whether or not the number of times of not responding is three or more. In this case, the number of times is set to three. However, the number of times can be set to an arbitrary number beforehand. If the decision result in step B6 is NO, the process proceeds to step B12. If the decision result in step B6 is YES, the process proceeds to step B9. In step B9, in order to change the sub station from a high-speed polling target sub station to a low-speed polling target sub station, the address of the sub station is moved from the high-speed polling address table 24 to the low-speed polling address table 23. Thereafter, the process proceeds to step B12.

Additionally, step B7 decides whether or not there are data. If the decision result in step B7 is NO, step B8 decides whether or not the number of times of there being no data is three or more. In this case, the number of times can also be set to an arbitrary number, that is other than three, beforehand. If the decision result in step B8 is YES, the process proceeds to step B9. If the decision result in step B8 is NO, the process proceeds to step B12. If the decision result in step B7 is YES, step B10 receives the data, and step B11 decides whether or not data reception ends. If the decision result in step B11 is NO, the process proceeds to step B13. Then, the polling is performed on the sub station of the same address as the previous time until the main station receives data transmission completion notification from the sub station. In addition, if the decision result in step B11 is YES, the process proceeds to step B12. In step B12, the high-speed polling address is updated so as to read the address of the next sub station of high-speed polling. Thereafter, the process proceeds to step B1.

Further, in step B1, when it is determined that the next polling is not a high-speed polling (NO in step B1), step B14 sets the high-speed polling flag OFF, and the process proceeds to step C1 (refer to FIG. 10). Step C1 reads a low-speed polling address from the low-speed polling address table 23. In step C2, control information is obtained. Then, in step C3, low-speed polling is performed according to the control by the polling control part 12 using a signal that includes a secondary channel including an address of a low-speed polling target sub station, and the high-speed polling flag is set OFF. Step C4 decides whether or not there is a response from the sub station. If the decision result in step C4 is YES, in step C5, the address of the sub station is moved from the low-speed polling address table 23 to the high-speed polling address table 24. On the other hand, if the decision result in step C4 is NO, in step C6, the next low-speed polling address is read from the low-speed polling address table 23, and the process proceeds to step B1 (refer to FIG. 9).

Figure 11:
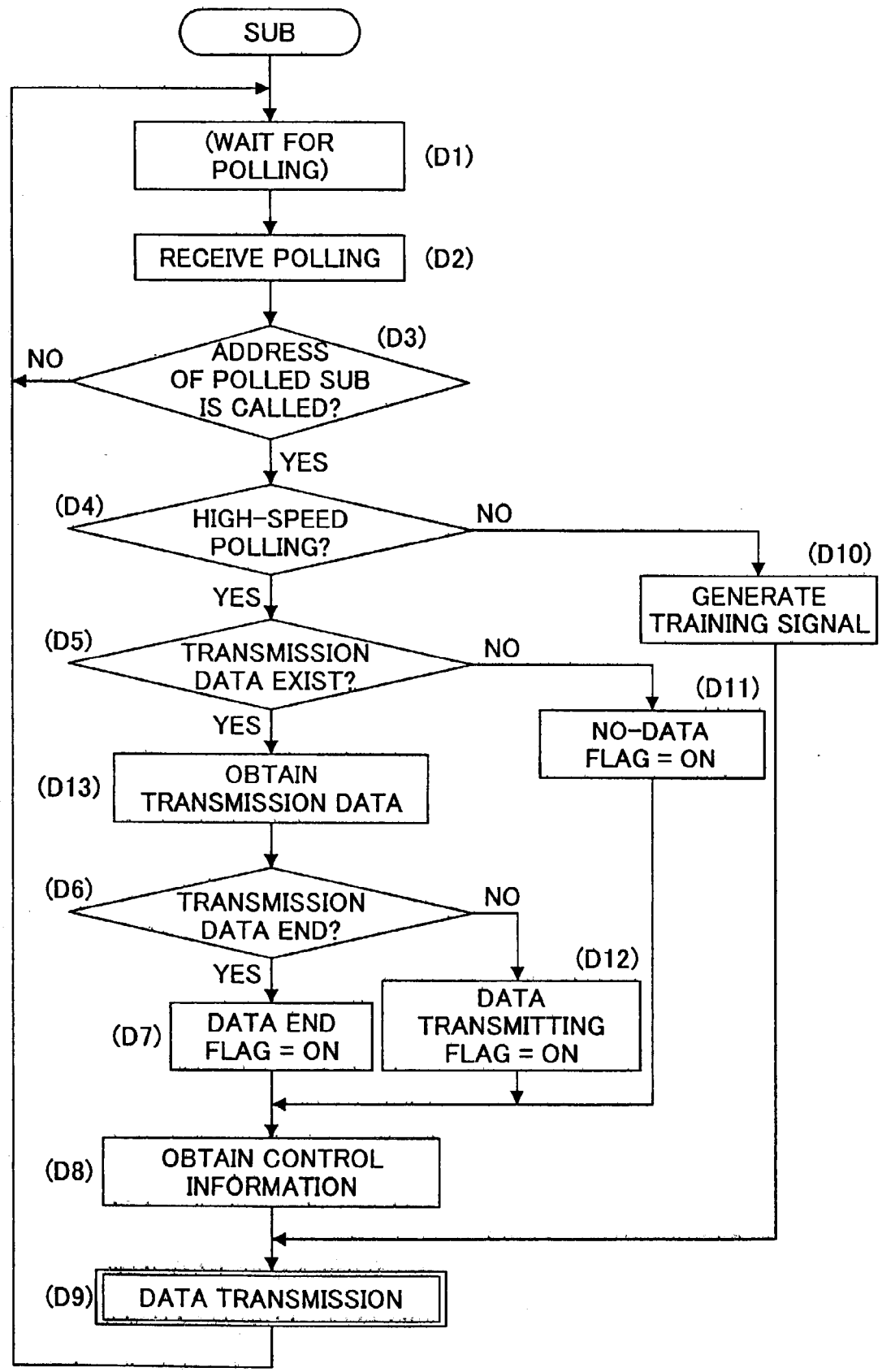
FIG. 11 is a flow chart for explaining a process of the sub station according to the embodiment of the present invention.

FIG. 11 is a flow chart for explaining a process of the sub station of the embodiment of the present invention. In step D1, the sub station is in a state of waiting for the polling. When the sub station is polled in step D2, in step D3, the address comparing part 39 compares the address that is set in the secondary channel with own address of the sub station, and determines whether or not the own address of the sub station is called. When the both addresses match (YES in step D3), the process proceeds to step D4, and when the both addresses do not match (NO in step D3), the process proceeds to step D1.

In step D4, the low-speed/high-speed polling information identification-part 38 decides whether or not it is high-speed polling depending on whether the high-speed polling flag that is set in the secondary channel is ON. In a case of high-speed polling (YES in step D4), in step D5, the data transmission monitoring part 40 decides whether or not there are transmission data. If the decision result in step D5 is YES, step D13 obtains the transmission data. Then, step D6 decides whether or not the transmission data ends. If the decision result in step D6 is YES, step D7 sets the data end flag ON. Additionally, if there is no high-speed polling (NO in step D4), step D10 activates the training signal generation part 37 so as to generate a training signal. Then, the process proceeds to step D9. Further, if the decision result in step D5 is NO, step D11 sets a no-data flag ON. In addition, if the decision result in step D6 is NO, step D12 sets a data transmitting flag ON. Then, step D8 obtains any of the data end flag, data transmitting flag, and no-data flag. Step D9 performs data transmission, and the process returns to step D1.

Figure 12:
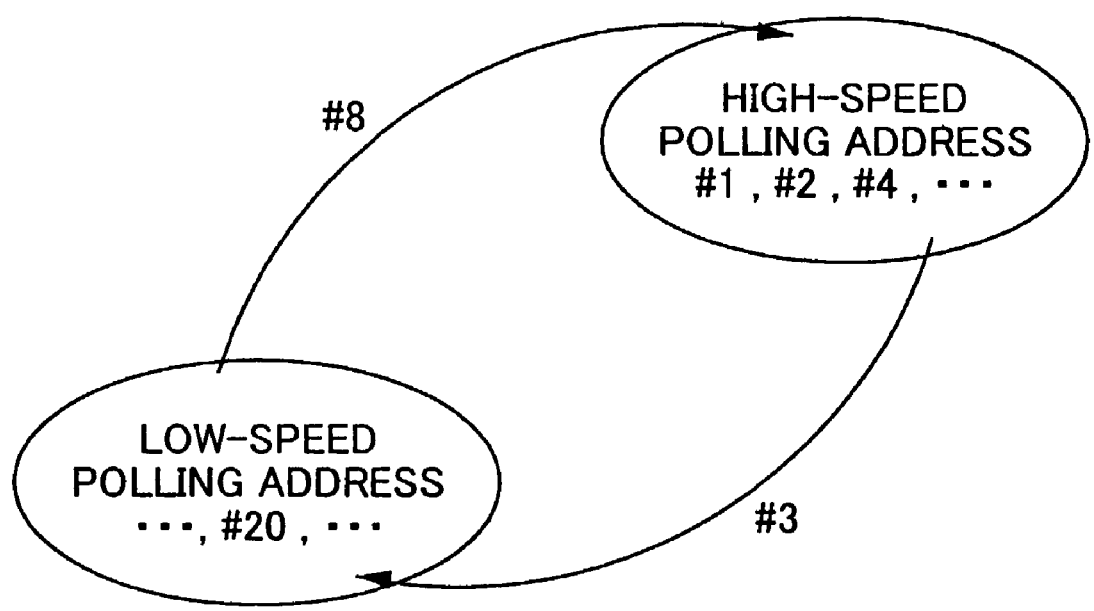
FIG. 12 is a state transition diagram between high-speed polling and low-speed polling.

FIG. 12 is a state transition diagram of high-speed polling and low-speed polling. In a case where there are low-speed polling target sub stations having addresses #8 and #20, when the sub station having the address #8 responds to low-speed polling, the sub station thereof is changed to a high-speed polling target sub station. When the sub station having the address #20 does not respond, the sub station thereof remains a low-speed polling target sub station. Additionally, in a case where there are high-speed polling target sub stations having addresses of #1, #2, #3, #4, . . . , when the sub station having the address #3 does not respond, or in a case where the above-mentioned number of times of not responding is equal to or more than a predetermined number of times, the sub station thereof is changed to a low-speed polling target sub station from next time. When the sub station having the address #3 responds to high-speed polling, the sub station remains a high-speed polling target sub station.

In low-speed polling, polling is performed at the rate of eight times per second (once in 125 ms) (refer to FIG. 7A), for example, as sequentially reading addresses of the low-speed polling target sub stations. In high-speed polling, polling is sequentially performed on all of the high-speed polling target sub stations in 125 ms. However, in the case of the high-speed polling, contents of user data must not be discontinued. Thus, a ratio of low-speed polling to high-speed polling is not always constant. The ratio varies depending on the message length of the user data.

Additionally, it is possible to vary the lengths of the low-speed polling interval and high-speed polling interval according to the number of low-speed polling target sub stations and the number of high-speed polling target sub stations. For example, in a case where the number of low-speed polling target sub stations is large (the number of addresses in the low-speed polling address table 23 of the address control part 13 (refer to FIG. 5) is large), the low-speed polling interval can be fixed longer such that the number of times of performing the low-speed polling in a predetermined polling cycle is increased by the low-speed/high-speed polling switching part 18 of the polling control part 12. On the contrary, in a case where the number of high-speed polling target sub stations is large (the number of addresses in the high-speed polling address table 24 of the address control part 13 is large), the high-speed polling interval can be fixed longer such that the number of times of performing the high-speed polling is increased by the low-speed/high-speed polling switching part 18 of the polling control part 12.

Figure 13:
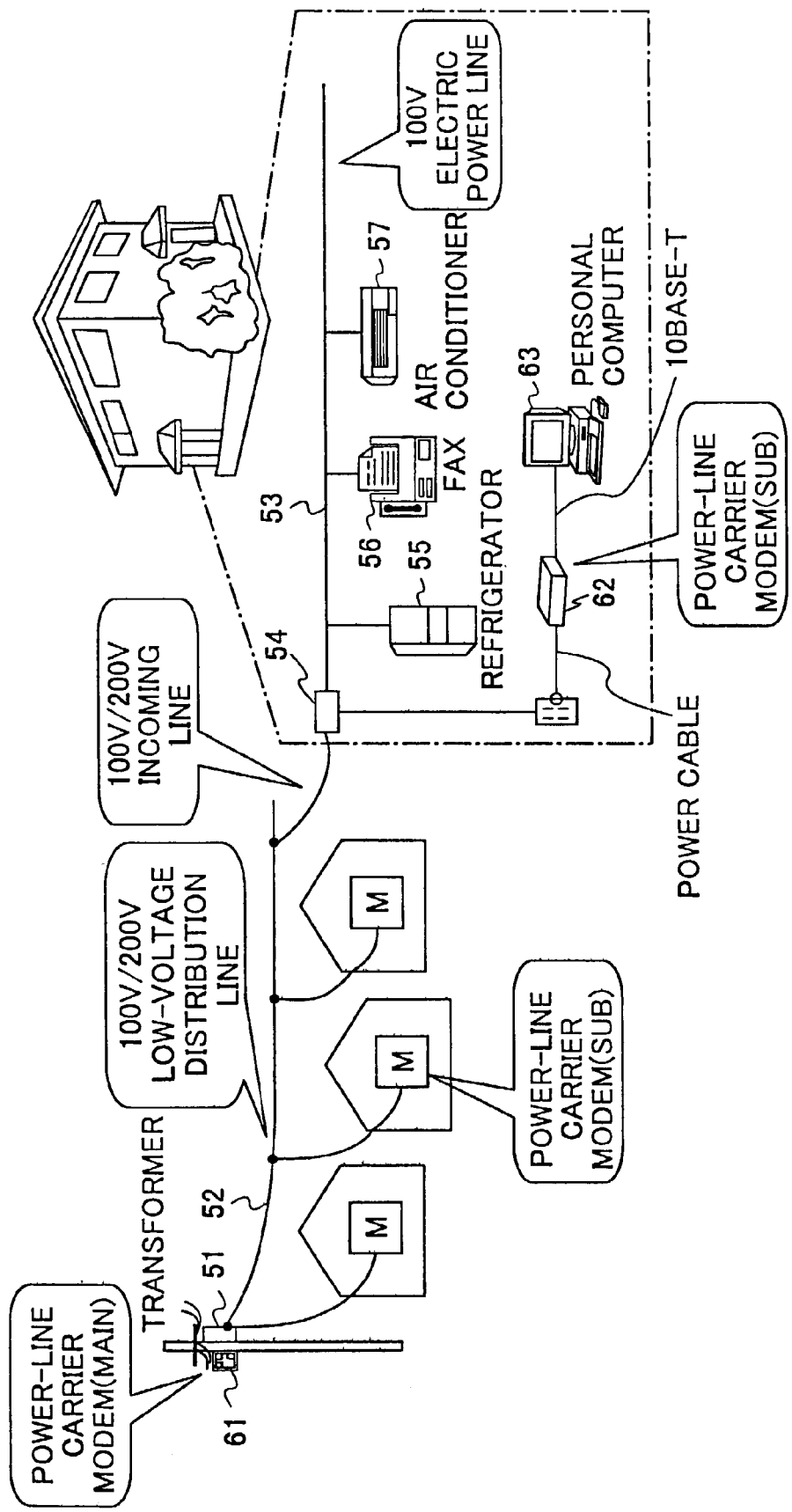
FIG. 13 is a schematic diagram showing a power-line carrier system.

FIG. 13 illustrates a power-line carrier system. In the system of FIG. 13, for example, a low-voltage distribution line 52 is connected to a transformer 51, which transforms high voltage (6600 V) to low voltage (100 V or 200 V). The low-voltage distribution line 52 is connected to a distribution board 54 in a house via an incoming line. An electric power line 53 in the house is connected to the distribution board 54. A refrigerator 55, a facsimile machine (fax) 56, an air conditioner 57 and the like, for example, are connected to the electric power line 53, or electrical household appliances are connected to an electric power line (not shown) that is branched out from the distribution board 54. A personal computer 63 is connected to a convenience outlet, which is connected to the electric power line 53 and serves as a sub station, via a power-line carrier modem (M) 62. A power-line carrier modem 61, which serves as a main station, is connected in a position of the transformer 51. In such a system, a power-line carrier system is proposed in which a home electric appliance network is structured for the home electric appliances, data are transmitted mutually by the CSMA/CD method or to/from a controller (not shown), the power-line carrier modem 61 serving as the main station is connected to the power-line carrier modem 62 serving as the sub station via the low-voltage distribution line 52, the incoming line, the convenience outlet of-the electric power line 53 and the like, and the personal computer 63 is connected to the Internet and the like.

In the above-described power-line carrier system, volume of traffic of the personal computer 63 and the like is greater than volume of traffic in the electrical household appliance network. At the same time, the electric power line 53 forms a transmission channel of a common power-line carrier. Accordingly, it is necessary to solve a problem of mutual interference.

Consequently, as shown in FIG. 14, the power-line carrier modem 61 serving as the main station outputs synchronizing frame pulses having a 1 s cycle, for example. Since communication among, the electrical household appliances in the electrical household appliance network is low-traffic, communication according to the CSMA/CD method or the like is performed by allocating a 10 ms interval in a cycle of the synchronizing frame pulses. The remaining 990 ms interval is allocated to power-line communication of the personal computer 63 and the like, since the power-line communication is high-traffic. In other words, a predetermined cycle of the frame pulses is divided into a communication interval of the electrical household appliances and a polling communication interval of the personal computer 63 and the like. In this case, each of the electrical household appliances has transmitting/receiving functions of detecting the frame pulses and identifying the communication interval of the electrical household appliances. Thereby, it is possible to prevent mutual interference between the communication among the electrical household appliances in the electrical household appliance network and the power-line communication according to the polling system. Further, a guard time (buffer) can be provided between the communication interval of the electrical household appliances and the polling communication interval of the power-line communication.

Additionally, in the interval that is allocated to power-line communication, polling is performed by the power-line carrier modem 61 serving as the main station to the power-line carrier modem 62 (M) in each house. Further, in the 990 ms interval that is the polling interval in this case, as described above, it is also possible to perform the polling to the low-speed polling target sub stations and the high-speed polling target sub stations. In that case, the power-line carrier modem 61 provided in the position of the transformer 51 can be structured as shown in FIG. 5, for example. At the same time, the polling control part 12 can control the communication with the sub stations according to the above-mentioned polling system in the interval of the power-line communication after the interval allocated to communication among the electrical household appliances based on the frame pulses. Moreover, the power-line carrier modem 62 provided indoors can be structured as shown in FIG. 6, for example.

Further, for example, according to a modification of the embodiment of the present invention, it is possible to perform control such that in a case where a plurality of kinds of polling intervals are set, sub stations with transmission data are changed to polling target sub stations on which the polling is performed many times, sub stations that do not have transmission data but respond to the polling remain polling target sub stations of a corresponding polling interval, and when number of times of having no transmission data exceeds a predetermined number of times, the sub stations are changed to polling target sub stations of a polling interval in which the polling is not performed many times.

The present invention is not limited to the specifically disclosed embodiments, and variations and modifications may be made without departing from the scope of the present invention.

The present application is based on Japanese priority application No. 2002-009991 filed on Jan. 18, 2002, the entire contents of which are hereby incorporated by reference.

What is claimed is:

1. A polling communication system, comprising:
a main station; and
a plurality of sub stations coupled to the main station,
said main station including:
an address control part that divides a predetermined polling cycle into a plurality of kinds of polling intervals each having a different number of times of polling and holds addresses of polling target sub stations corresponding to the plurality of kinds of polling intervals; and
a first polling control part that switches the plurality of kinds of polling intervals, and at the same time, controls movement from one polling interval to another polling interval of the addresses of the said stations held in the address control part according to states of the sub stations including whether or not there are responses from the sub stations,
each of die sub stations including:
a second polling control part that sends a response depending on existence of transmission data when the sub station is polled by the main station.

2. The polling communication system as claimed in claim 1, wherein:
the address control part switches between a low-speed polling interval and a high-speed polling interval in the predetermined pcnling cycle and includes a low-speed polling address table representing addresses of low-speed polling target sub stations on which the polling is performed in the low-speed polling interval and a high-speed polling address table representing addresses of high-speed polling targets sub stations on which the polling is performed in the high-speed polling interval, and
the first polling control part switches between the low-speed polling interval and the high-speed polling interval, performs the polling according to the addresses in the low-speed polling address table in the low-speed polling interval, performs the polling according to the addresses in the high-speed polling address table in the high-speed polling interval, changes the sub stations that respond to the polling in the low-speed polling interval to the high-speed polling target sub stations and changes the sub stations that do not respond to the polling in the high-speed polling interval to the low-speed polling target sub stations, and the sub station includes a polling control part that sends a response depending on the existence of transmission data in response to the polling by the main station.

3. The polling communication system as claimed in claim 2, wherein the first polling control part switches between the low-speed polling interval and the high-speed polling interval according to muter of the low-speed polling target sub stations and number of the high-speed polling target sub stations.

4. A polling communication system, comprising:
a main station;
a plurality of sub stations; and
a home electric appliance network, wherein the main station includes a first polling control part that divides a predetermined cycle into a communication interval of the home electric appliance network and a polling communication interval of the main station and the plurality of the sub stations, and performs polling on the plurality of sub stations in the polling communication interval, each of the sub stations includes a second polling control part that sends a response depending on existence of transmission data in response to the polling by the main station, the first polling control part divides a predetermined cycle into the communication interval of the home electric appliance network and the polling communication interval of the main station and the plurality of the sub stations, further divides the polling communication interval into a plurality of kinds of polling intervals each having a different number of times of polling, and performs the polling by switching the plurality of kinds of polling intervals, and the main station further includes:
an address control part that holds addresses of polling target sub stations in the plurality of kinds of polling intervals.

5. A polling control method for a polling communication system having a plurality of sub stations coupled to a main station, comprising the steps of:

dividing a predetermined polling cycle of the main station to the plurality of sub stations into a plurality of kinds of polling intervals including at least a high-speed interval in which a large number of pollings is made and a low-speed interval in which a small number of pollings is made, each having a different number of times of polling;

changing the sub stations that have not responded to the polling to polling target sub stations in the low-speed polling interval wherein a number of times of performing the low-speed polling in the predetermined polling cycle is increased to make the low-speed polling interval longer when a number of low-speed polling target sub stations is large; and changing the sub stations that have responded to the polling to polling target sub stations in the high-speed polling interval wherein a number of times of performing the high-speed polling in the predetermined polling cycle is increased to make the high-speed polling interval longer when a number of high-speed polling target sub stations is large.

6. The polling control method as claimed in claim 5, further comprising the steps of:

dividing the predetermined polling cycle of the main station to the plurality of sub stations into a low-speed polling interval mid a high-speed polling term;

changing the sub stations that have responded to the polling in the low-speed polling interval to high-speed polling target substations; and changing the sub stations that have not responded to the polling in the high-speed polling interval to low-speed polling target sub stations.

7. The polling control method as claimed in claim 6, further comprising the step of:

changing the low-speed polling interval and high-speed polling interval in the polling cycle according to the number of the low-speed polling target sub stations and the number of the high-speed polling target sub stations.

8. A polling control method to be implemented in a main station in a polling communication system including the main station, a plurality of sub stations and a home electric appliance network, comprising the steps of:

dividing a predetermined cycle into a communication interval of the home electric appliance network and a polling communication interval of the main station and the plurality of sub stations;

pollng the plurality of sub stations in the polling communication interval;

dividing the pollling communication interval into a plurality of kinds of polling intervals each having a different number of times of polling;

performing the polling by switching the plurality of kinds of polling intervals;

changing the sub stations that have not responded to the polling the main station to polling target sub stations in a polling interval having a few times of polling;

changing the sub stations that have responded to the polling to polling target sub stations in a polling interval having many times of polling; and holding addresses of the polling target sub stations in the plurality of kinds of polling intervals.

9. A main station which couples to a plurality of sub stations, comprising:

an address control part that divides a predetermined polling cycle into a plurality of kinds of polling intervals each having a different number of times of polling and holds addresses of polling target sub stations corresponding to the plurality of kinds of polling intervals; and a polling control pan that switches the plurality of kinds of polling intervals, and at the same time, controls movement from one polling interval to another polling interval of the addresses of the sub stations held in the address control part according to states of the sub stations including whether or not a response is received from the sub stations, said response being received depending on existence of transmission data when the sub station is polled.

* * * * *